United States Patent Office 3,843,323
Patented Oct. 22, 1974

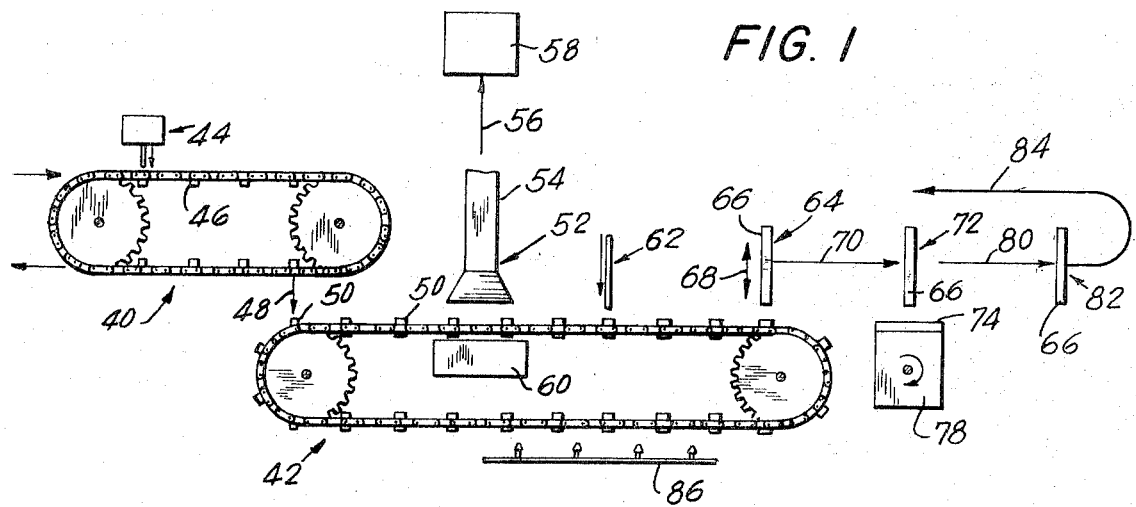
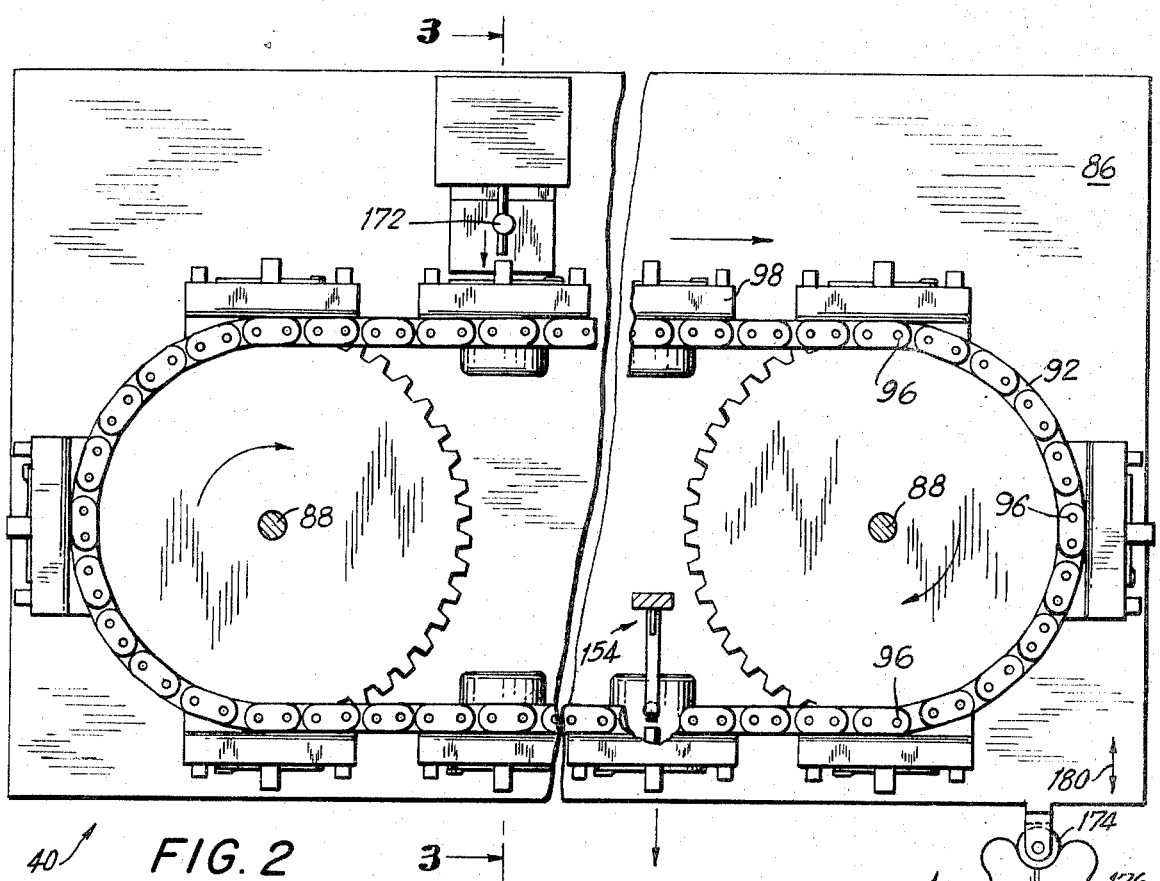
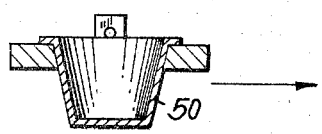

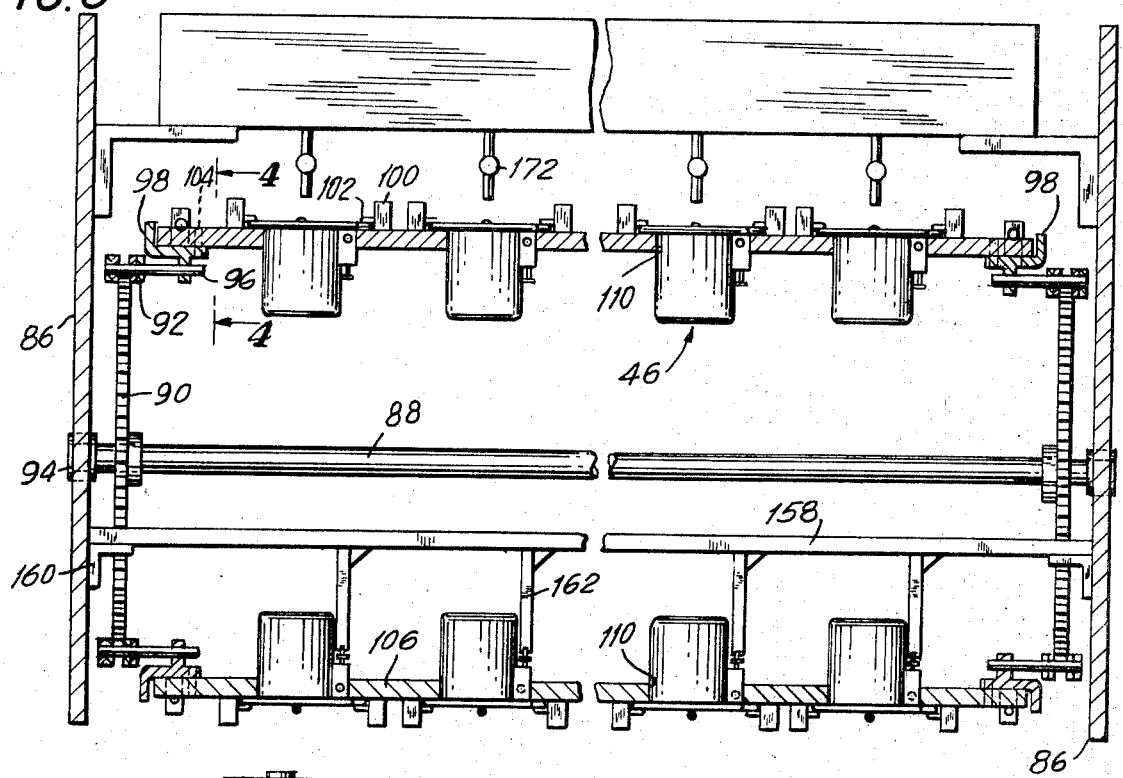
FIG. 3
FIG. 4
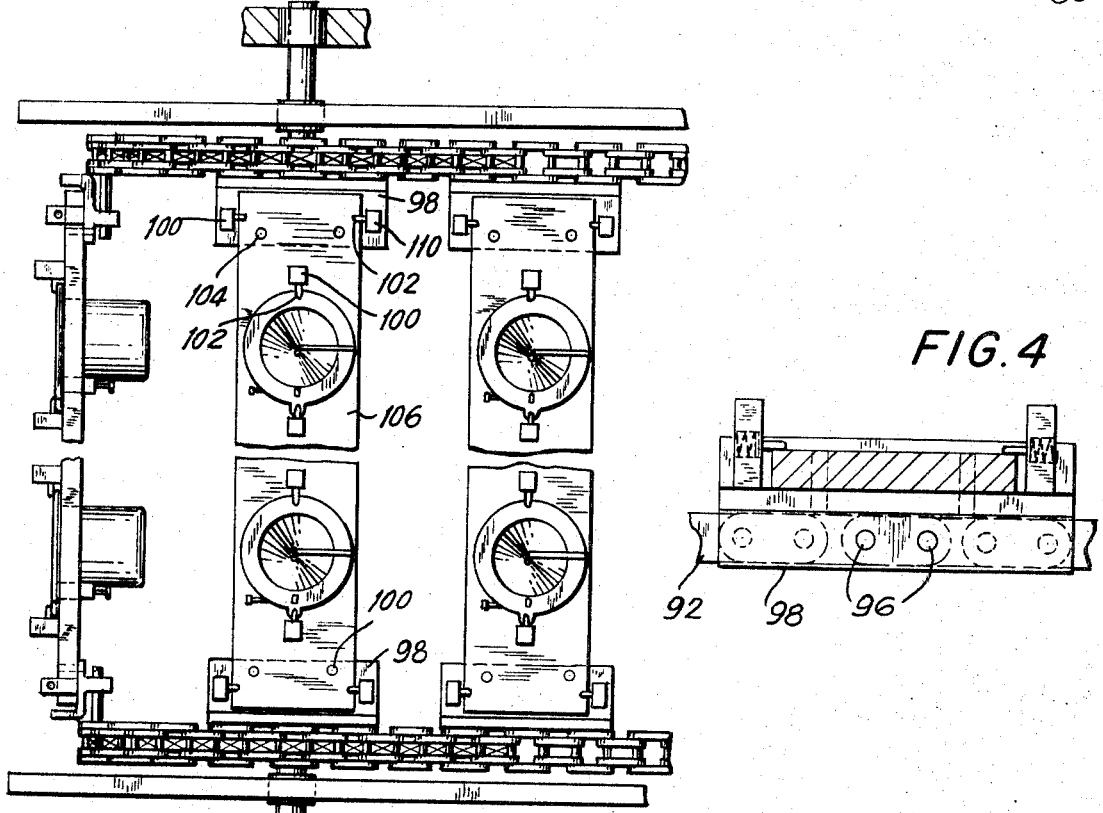
FIG. 5

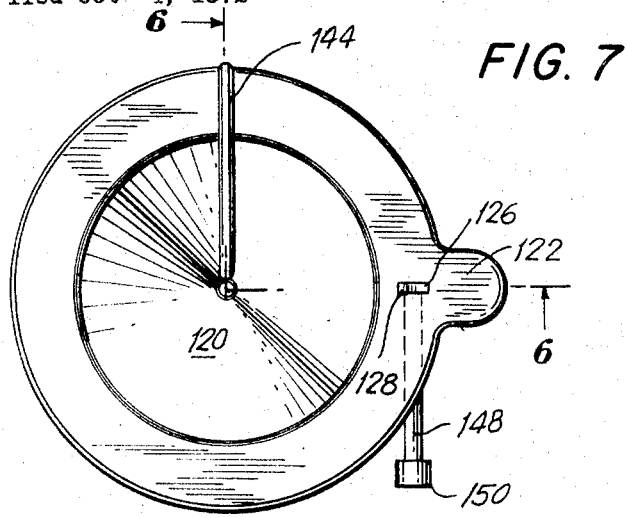
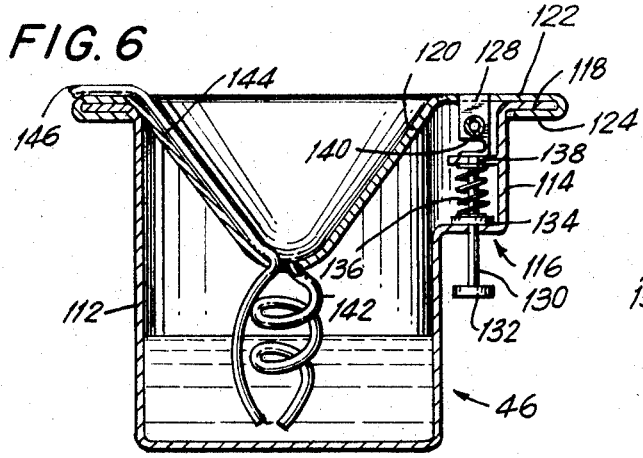
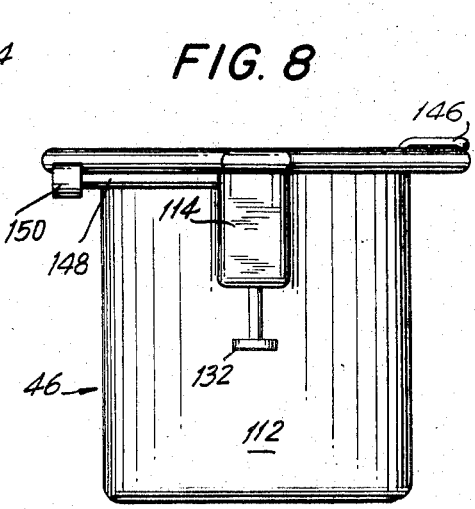
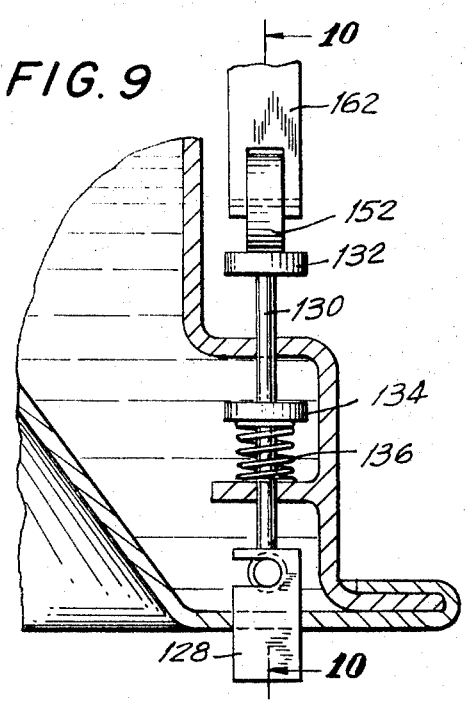
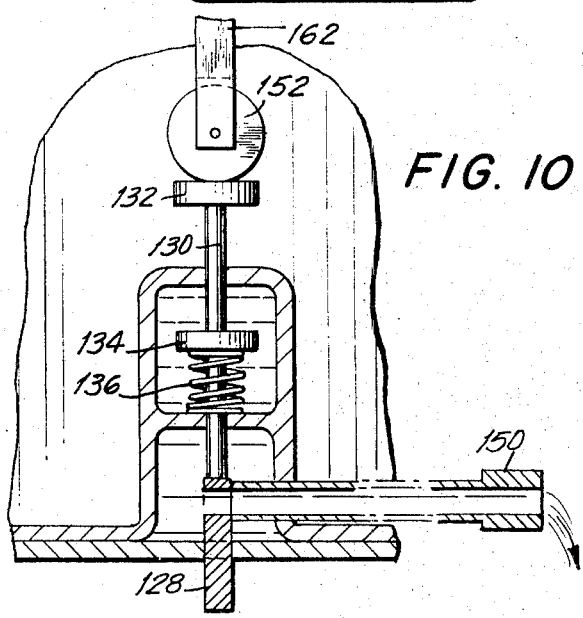

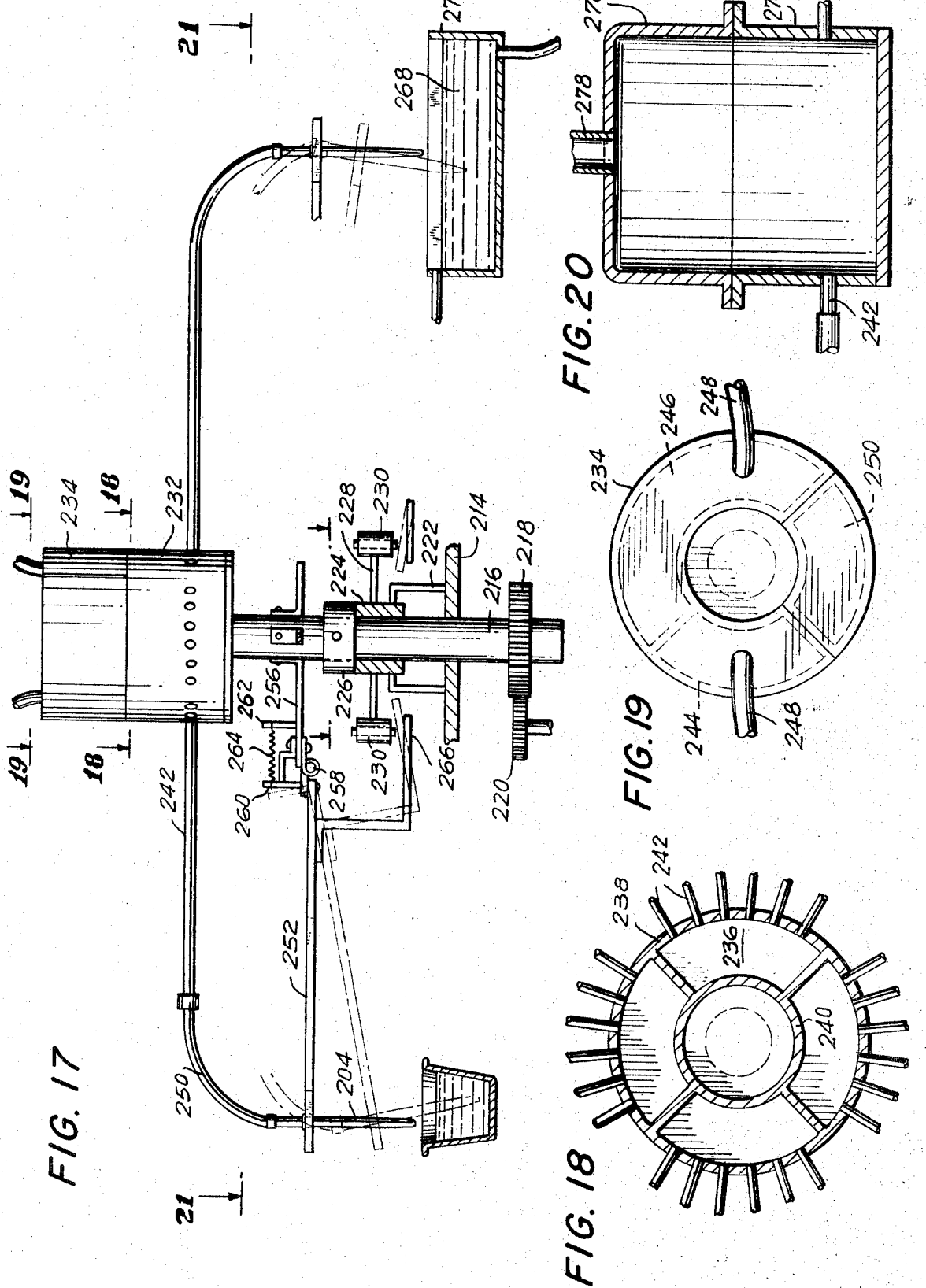

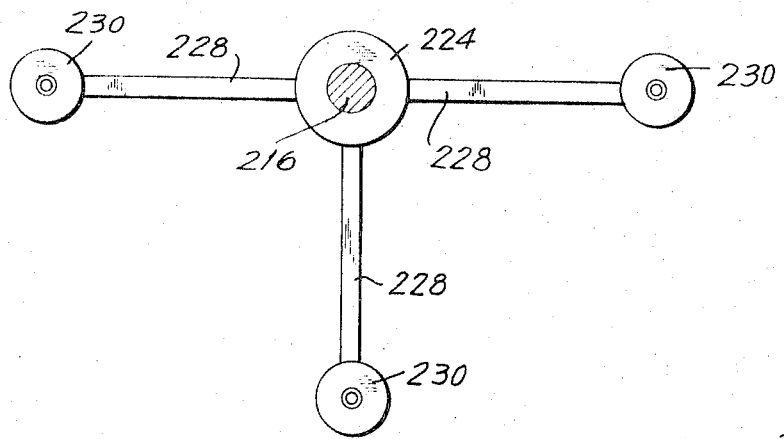
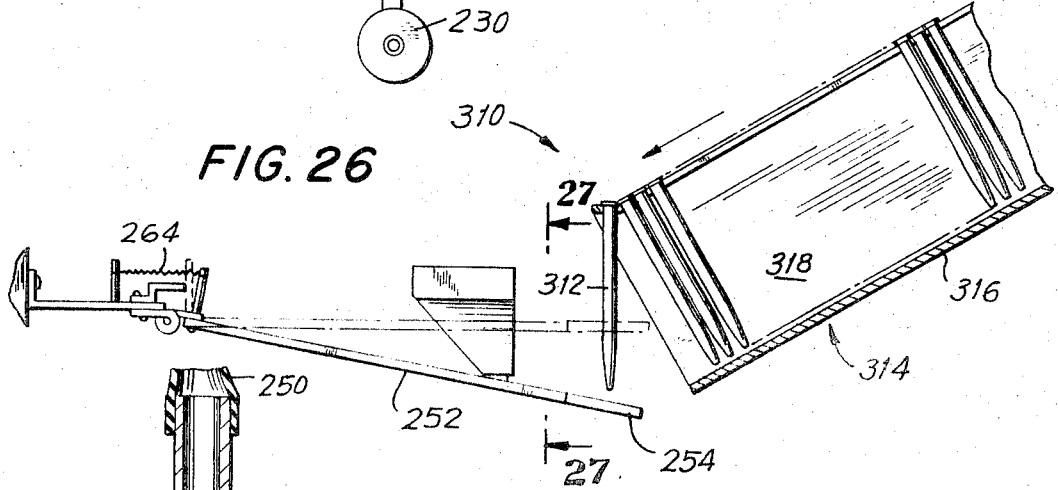
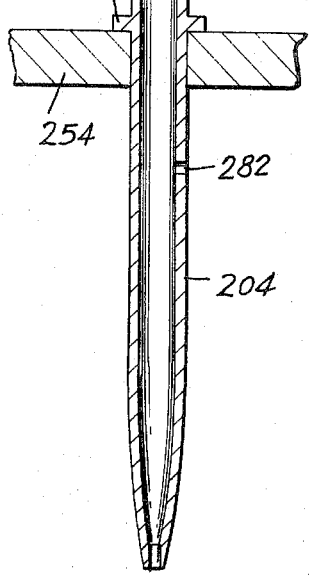
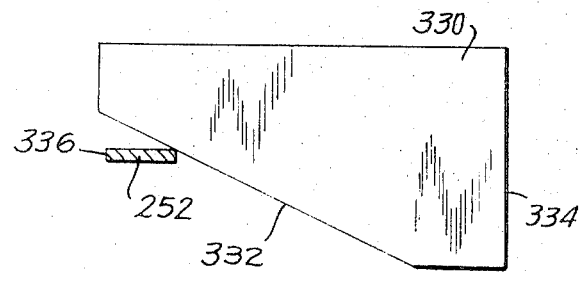

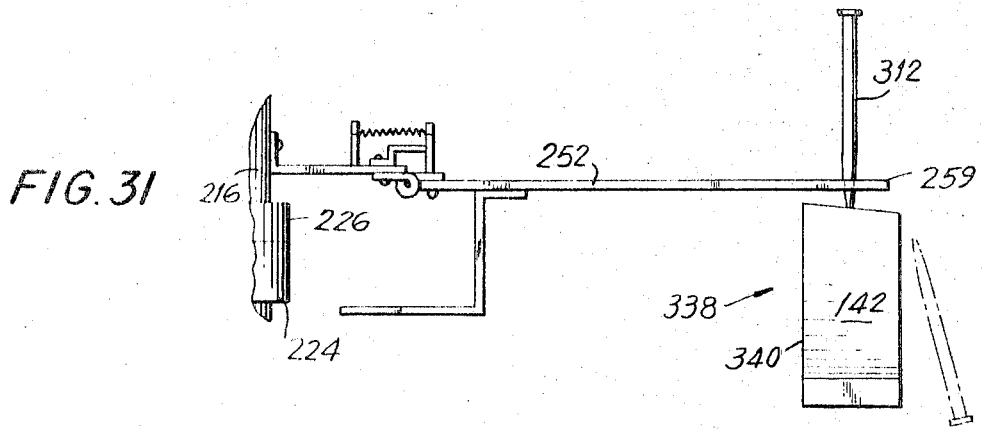
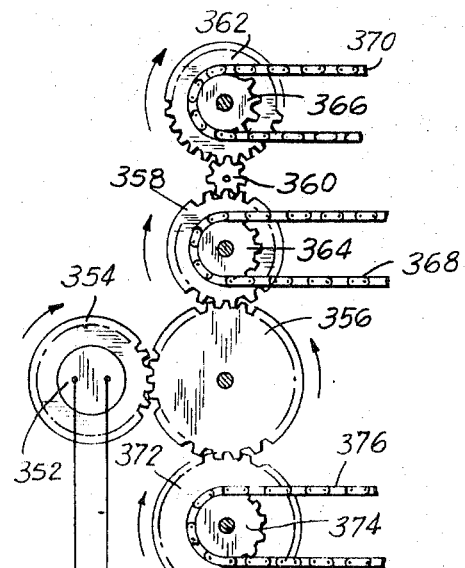
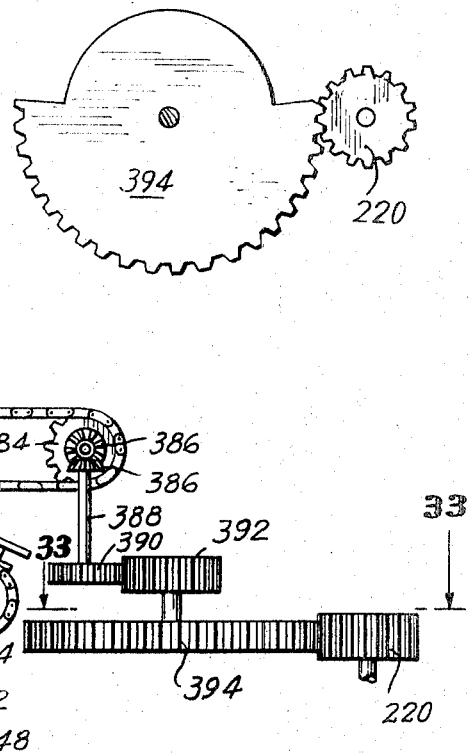
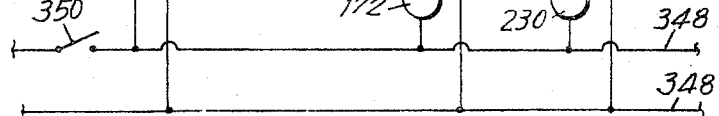

3,843,323
METHOD AND APPARATUS FOR SAMPLE EVALUATION
Babington A. Quame, 331 E. 29th St., New York, N.Y. 10016
Filed Oct. 4, 1972, Ser. No. 294,849
Int. Cl. G01n 1/14
U.S. Cl. 23—230 B                          19 Claims

ABSTRACT OF THE DISCLOSURE

A method and apparatus for evaluating urine samples to determine whether or not the sample contains a drug such as narcotic analgesics, amphetamines, and addictive sedatives. From urine samples there are derived in successive series of first containers mediums which are adapted to have eluent added thereto for extracting a drug if it is present in the medium, and successive series of these first containers are conveyed to an eluting station where eluent is added simultaneously to each series of first containers which are arranged in a row at the eluting station. Eluate is then transferred from the first containers to successive series of second containers which are separately conveyed first to a receiving station to receive the eluate, then to an evaporating station where the solvent is evaporated from the successive series of second containers, then to a solvent station where additional solvent is added to the residues, and then to a removing station where part of the solvent with the residue dissolved therein is removed from the successive series of second containers. Capillary tubes are used to remove the solvent and these tubes are then transferred to a spotting station where they are actuated to provide spots on successive chromatographic plates which are successively conveyed to the spotting station. All of the above operations are carried out simultaneously so that, for example, elution is taking place while evaporation, removal, and spotting are also all taking place simultaneously, so that in this way a large number of samples are treated in an extremely short time.

BACKGROUND OF THE INVENTION

The present invention relates to methods and apparatus for sample evaluation.

In particular, the present invention relates to methods and apparatus for evaluating urine samples to determine whether or not any given urine sample contains a drug such as narcotic analgesics, amphetamines, and addictive sedatives.

Although the basic chemistry required for such sampling operations is known, the manipulations involved are very time consuming so that a considerable amount of labor, time, and costs are required to carry out the sampling procedures in connection with a large number of urine samples. As a result it is not uncommon to encounter large backlogs of samples which require testing at any given facility where such sampling is carried out. In addition, the costs involved are very high, so that considerable difficulty is encountered in obtaining funding to carry out the above procedures to the extent required by the widespread drug problem so common in large metropolises.

An additional drawback encountered with conventional procedures of the above type is that they must be carried out by relatively skilled personel so that the labor costs are extremely high.

SUMMARY OF THE INVENTION

It is accordingly a primary object of the present invention to provide a method and apparatus which will avoid the above drawbacks.

In particular, it is an object of the present invention to provide a method and apparatus for evaluating urine samples in such a way that large numbers of samples can be handled in an extremely short time with a relatively simple apparatus of relatively small dimensions which can be operated by relatively unskilled personnel.

In addition it is an object of the present invention to provide a method and apparatus which enables a large part of the structure which is used to be repeatedly used over and over so that after initial costs, the costs involved in maintaining the apparatus in operation is relatively low.

In addition it is an object of the invention to provide a method and apparatus of the above type which require only inexpensive components to be replaced.

Furthermore, it is an object of the present invention to provide a method and apparatus of the above type capable of achieving spots on chromatographic plates in large numbers and in a relatively short period of time so that a large number of samples can be evaluated in a highly expeditious and inexpensive manner without any sacrifice of accuracy.

Furthermore, it is an object of the invention to provide a method and apparatus of this type capable of evaluating samples to determine the presence of all drugs such as narcotic analgesics, amphetamines, and addictive sedatives.

According to the method of the invention tests are made of a plurality of urine samples to determine the presence of a drug such as narcotic analgesics, amphetamines, and addictive sedatives. First a plurality of urine samples are respectively poured into a series of first containers for providing in the latter a series of mediums, respectively, which are adapted to receive an eluent. These first containers are respectively arranged at locations where they are adapted to receive eluent simultaneously. A given amount of eluent which will elute at least one of said drugs is poured simultaneously respectively into the series of first containers to extract the drug, if any, from the mediums which are respectively located in the series of first containers. Eluate is simultaneously transferred from the series of first containers respectively into a series of second containers, and then the solvents in the second containers are simultaneously evaporated therefrom to leave residues in the second containers. Additional solvent is then simultaneously added to the series of second containers so that the residues become dissolved in the additional solvent, and small portions of the solvents in the several second containers are simultaneously removed therefrom and utilized to spot a chromatographic plate simultaneously with a series of spots indicative of a drug present in the urine sample. All of these steps are repeated with successive series of the above containers and with a plurality of chromatographic plates each of which will have thereon a series of spots.

The apparatus of the invention includes a first conveyer means for successively conveying rows of first containers to an eluting station. A means at the eluting station simultaneously adds eluent to the first containers of each row as it becomes located by the conveyer means at the eluting station. A second conveyer means is situated in part beneath the first conveyer means for conveying rows of second containers successively to a receiving location where the second containers of each row at the receiving location simultaneously receive eluate from each row of first containers. The second conveyer means then conveys the rows of second containers successively to an evaporating station and then successively to a solvent station and a removing station. An evaporating means at the evaporating station evaporates solvent from each row of second containers which is conveyed to the evaporating station by the second conveyer means. A means at the solvent station adds solvent to the second containers of each row of second containers conveyed to the solvent station by the second conveyer means. A removing means is located at the removing station for removing from the second containers of each row of second containers which arrives at the removing station a portion of the solvent in each row of second containers. A transfer means is operatively connected with the removing means for transferring the latter from the removing station to a spotting station. A third conveyer means conveys chromatographic plates successively to the spotting station, and a spotting means at the spotting station cooperates with the removing means for actuating the latter to provide on each chromatographic plate conveyed to the spotting station by the third conveyer means a series of spots from the removing means. A collecting means is situated adjacent the third conveyer means for collecting the chromatographic plates with the spots thereon. A control means is operatively connected with all of the conveyer means as well as with the means at the eluting and solvent stations and with the removing and spotting means for actuating all of the latter means in timed relation so that they all operate in a sequence which will provide spots on successive chromatographic plates while the several conveyer means operate simultaneously.

BRIEF DESCRIPTION OF DRAWINGS

The invention is illustrated by way of example in the accompanying drawings which form part of this application and in which:

FIG. 1 is a schematic representation of an apparatus of the invention for carrying out the method of the invention;

FIG. 2 is a fragmentary partly sectional elevation of a first conveyer means which is shown in connection with an eluting station;

FIG. 3 is a fragmentary transverse sectional elevation taken along line 3—3 of FIG. 2 in the direction of the arrows and illustrating additional details of the embodiment of FIG. 2;

FIG. 4 is a transverse fragmentary sectional elevation taken along line 4—4 of FIG. 3 in the direction of the arrows and illustrating further details of the structure of FIGS. 2 and 3;

FIG. 5 is a fragmentary top plan view showing successive rows of first containers as they are conveyed by the first conveyer means;

FIG. 6 is a sectional elevation, taken along lines 6—6 of FIG. 7 in the direction of the arrows, showing the details of one of the first containers conveyed by the conveyer means of FIGS. 2–5;

FIG. 7 is a top plan view of the container of FIG. 6;

FIG. 8 is an elevation of the container of FIG. 6 as seen from the right of FIG. 6;

FIG. 9 is a fragmentary sectional elevation on an enlarged scale as compared to the remaining figures and showing how a valve-actuating means operates a valve of each of the containers;

FIG. 10 is a fragmentary sectional elevation taken along line 10—10 of FIG. 9 in the direction of the arrows;

FIG. 17 is a fragmentary partly sectional schematic elevation of a removing and washing means, FIG. 17 also showing part of a spotting means;

FIG. 18 is a sectional fragmentary plan view taken along line 18—18 of FIG. 17 in the direction of the arrows;

FIG. 19 is a top plan view of the structure of FIG. 17 taken along lines 19—19 of FIG. 17 in the direction of the arrows;

FIG. 20 is a sectional elevation of a suction head to be used in connection with another embodiment of the invention;

FIG. 24 is a partly sectional plan view taken along line 24—24 of FIG. 17 in the direction of the arrows and showing the arrangement of electromagnetic actuating devices;

FIG. 25 is a sectional elevation on an enlarged scale as compared to FIG. 17 showing the details of a capillary tube and the carrier means which carries the capillary tube;

FIG. 26 is a fragmentary schematic illustration showing partly in section a further embodiment according to which capillary tubes are discarded with new capillary tubes being supplied with an arrangement as shown in FIG. 26;

FIG. 27 is a partly sectional elevation taken along line 27—27 of FIG. 26 in the direction of the arrows and showing further details of a cam which controls a carrier means of this embodiment;

FIG. 31 is an end view of the structure of FIG. 30 showing additional details of the discarding means;

FIG. 32 is a schematic representation of a control means which times the entire apparatus so that its various portions will operate in proper time sequence; and FIG. 33 is a fragmentary plan view taken along line 33—33 of FIG. 2 in the direction of the arrows and showing further details of the control structure.

DESCRIPTION OF PREFERRED EMBODIMENTS

Figure 12:
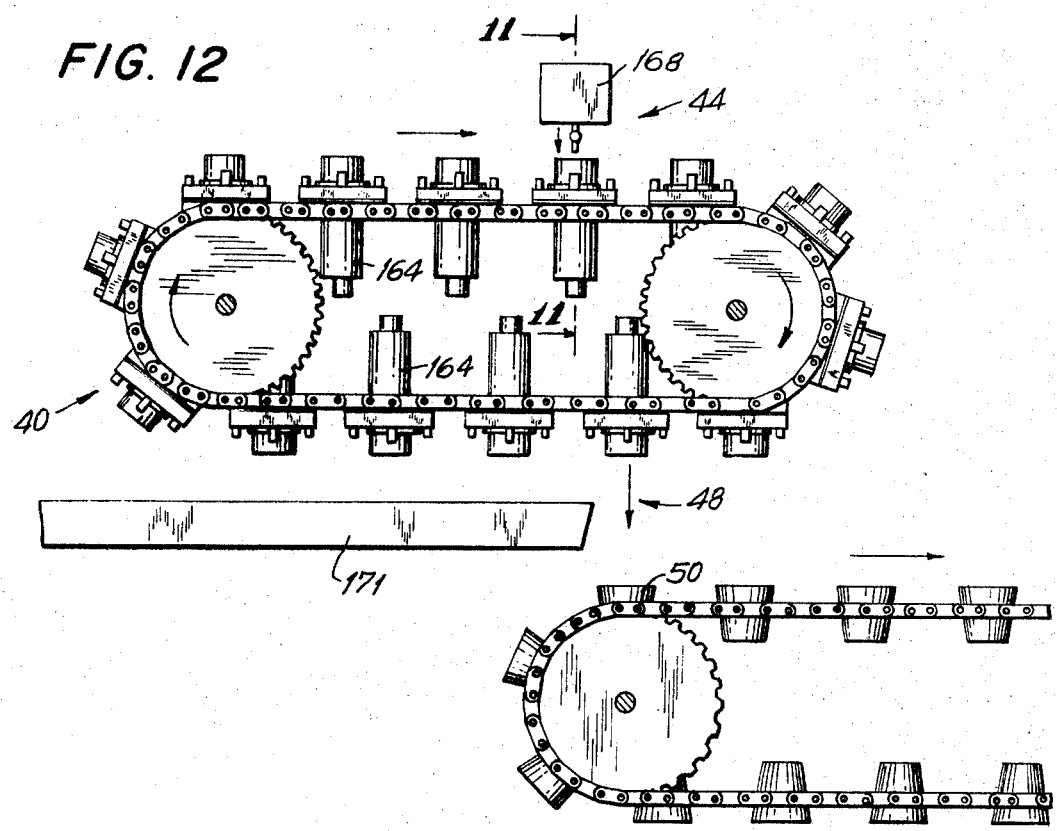
FIG. 12 is a fragmentary schematic elevation of a second embodiment of the invention.

Referring first to FIG. 1, there is schematically represented therein a general layout of an apparatus of the invention for carrying out the method of the invention. The apparatus shown in FIG. 1 includes a first conveyer means 40 shown at the upper left of FIG. 1 and a second conveyer means 42 which in part is situated beneath the first conveyer means 40 with the conveyer means 42 extending beyond the first conveyer means 40 to the right, as viewed in FIG. 1. As is indicated by the arrows at the left of FIG. 1, the upper run of conveyer means 40 moves to the right while the lower run moves to the left, and of course the illustrated gears rotate in a clockwise direction and are driven from any suitable drive.

The conveyer means 40 is adapted to carry groups of containers, each group forming a series extending in a row parallel to the axis of rotation of the gears of the conveyer 40, and thus each group extends perpendicularly to the plane of FIG. 1 and advances toward the right at the upper run of the conveyer means 40. Each series of first containers thus conveyed by the conveyer means 40 passes beneath a means 44 which adds to each first container of each series a given amount of eluent which reacts with a medium in each of the first containers so as to extract from the medium a drug such as narcotic analgesics, anphetamines, and addictive sedatives. FIG. 1 illustrates the rows of containers 46 with the containers in each row extending perpendicularly to the plane of FIG. 1 and with the several rows following one after the other to the location beneath the means 44 which supplies the eluent.

When each row of containers 46 reaches the location of the arrow 48, the eluate is transferred from each series of first containers to a series of second containers 50 carried by the second conveyer means 42. These series of second containers 50 are also arranged in rows extending transversely with respect to the plane of FIG. 1, and as each row of containers 50 becomes located at the receiving station 48 eluate is transferred from the first containers 46 to the second containers 50. Thus, the means 44 is located at an eluting station where eluent is added to the medium in each successive series of containers 46 which reach the eluting station, and then when the successive series of containers reach the receiving station indicated by the arrow 48, the eluate is transferred from a series of containers 46 to a series of containers 50, respectively.

The gears of the second conveyer means 42 are also driven so that they rotate in a clockwise direction, as viewed in FIG. 1, and thus the upper run of the conveyer means 42 also advances to the right, as viewed in FIG. 1. In this way the successive rows or series of containers 50 are advanced from the receiving station 48 to an evaporating station 52. At the evaporating station 52 is an evaporator means formed in part by the hood 54 connected to a suitable blower or the like so as to suck vapors in the direction of the arrow 56. As is shown schematically in FIG. 1, the vapors are delivered to a distilling or condensing unit 58 which serves to regain the solvents which are evaporated at the evaporating station 52. The several containers 50 are also heated by a heating means 60 at the evaporating station 52 so that the eluate in each series of containers 50 is rapidly evaporated at the evaporating station. In this way there will be left in each container 50 of each row or series of containers 50 a residue which is advanced by the conveyer means 42 beyond the evaporating station 52 to a solvent station 62. At the solvent station 62 a certain amount of solvent is added to the residue in the second containers 50 of each series of containers as each row or series reaches the solvent station 62. The structure of the solvent-supply means at the solvent station 62 is identical with the structure of the eluent supply means at the eluting station 44, the only difference being that at the eluting station 44 the eluent is supplied to each series of first containers 46 while at the solvent station 62 solvent is supplied to each series of second containers 50.

As the successive series of second containers 50 are advanced by the conveyer means 42 beyond the solvent station 62, they are conveyed to a removing station 64. At the removing station 64 is a removing means 66 in the form of a row of capillary tubes which are dipped first into the containers 50 of each series which arrives at the removing station 64 and then raised out of the latter, as indicated by the double-headed arrow 68. In this way a small portion of the solvent and residue dissolved therein is removed from each container 50 of each row or series thereof which arrives at the removing station 64.

A transfer means, described in greater detail below, then transfers the removing means 66 in the manner indicated by the arrow 70 to a spotting station 72 where the removing means 66 is acted upon so as to apply a row of spots to a chromatographic plate 74 forming one of a series of successive chromatographic plates moved up to and beyond the spotting station 72 by a third conveyer means 78 schematically represented in FIG. 1. After each row of spots is applied to each chromatographic plate 74, the successive plates 74 are collected in a manner described below so that the spots can then be evaluated to determine the presence of a drug in the urine sample which has been tested in this way.

The removing means 66 are then transferred beyond the spotting station 72, in the manner indicated by the arrow 80, to a washing station 82 where the several capillary tubes of the removing means 66 are washed before beig returned, in the manner indicated by the arrow 84, back to the removing station 64. Thus, with the particular arrangement shown in FIG. 1 the several capillary tubes of the removing means 66 are used over and over, these tubes being washed at the washing station 82 before they arrive back at the removing station 64. However, according to a different embodiment of the invention the several tubes may be discarded and replaced by new tubes.

As is indicated in FIG. 1, the several containers 50 are conveyed by the conveying means 42 beyond the removing station 64 to move to the left with the lower run of the conveyer means 42, as viewed in FIG. 1, back to the receiving station 48. As the several containers 50 move with the lower run of the conveyer means 42, they are washed as by being subjected to the action of liquid washing jets supplied through a jet washing unit 86 which is schematically represented in FIG. 1, and thus all of the containers 50 are in a clean, dry condition by the time they return to the receiving station 48.

With the above arrangement shown schematically in FIG. 1, the several series of first containers 46 are adapted to receive urine from the samples themselves so that the urine forms the medium which receives the eluent at the eluting station 44. However, it is possible to use instead of such containers 46 other containers which contain an adsorbing medium which adsorbs the drug if it is present in the urine. In this case the urine simply flows directly through the container with the adsorbing medium therein to be received in a suitable tray from which the urine may be discarded. In this case the eluent is added to the adsorbing medium in the container. This represents another embodiment of the invention which is described in further detail below. The adsorbing medium may be a styrene-divinylbenzene copolymer, sold under the trade name Amberlite XAD–1, XAD–2, and XAD–4.

Referring now to FIGS. 2–5, the details of the conveyer means 40 are illustrated therein. Thus, it will be seen that the conveyer means 40 includes a pair of side frame members 86 supported in any suitable way and carrying the shafts 88 which in turn carry the gears or sprockets wheels 90 which mesh with the pair of endless sprocket chains 92. The ends of the shafts 88 are supported for rotary movement in any suitable bearings 94 carried by the side frame members 86.

Pairs of opposed links of the sprocket chains 92 which are aligned with each other have their pins 96 extended so as to project through openings in a pair of aligned substantially L-shaped brackets 98. These pins are fixed to the brackets 98, and the pairs of aligned brackets 98 are spaced from each other along the chains 92 in the manner shown in FIGS. 2 and 5. Each elongated substantially L-shaped bracket 98 carries a pair of housings 100 in which are accommodated spring-pressed pins 102 which are aligned with and project toward each other on each bracket 98, as shown most clearly in FIG. 5. In addition each bracket 98 carries a pair of positioning pins 104.

With this arrangement each pair of aligned brackets 98 is adapted to support an elongated plate 106 which extends between each pair of aligned brackets 98, resting thereon. These plates 106 are formed with openings 108 which are adapted to receive the locating pins 104. Thus, each plate 106 will be placed on a pair of aligned brackets 98, with the pins 102 being retracted in order to permit the plates 106 to be placed on the brackets 98. Then the pins 102 are released so as to project over the plates 106 and thus releasably retain them on the brackets 98. The pins 104 which are received in the openings 108 secure the location of each plate 106 on each pair of aligned brackets 98. In this way the plates 106 extend between the pair of chains 92 and are conveyed by the conveyer means in the manner described above.

Each plate 106 is formed with a row of openings 110, and the several containers 46 are received in these openings. Each plate 106 in addition carries pairs of housings 100 provided with spring-pressed pins 102 which are adapted to extend over peripheral flanges of the containers 46 for retaining the latter on the plates 106 while permitting easy removal of the containers 46 and replacement thereof by way of the longitudinally movable spring-pressed pins 102.

It is thus clear that with this arrangement the several rows of containers 46 will be securely carried by the plates 106 with the latter securely carried by the brackets 98 so that as the chains 92 are driven by the gears 90 the conveyer means 40 will serve to convey each series of containers 46 in the manner described above in connection with FIG. 1.

The details of each container 46 are illustrated in FIGS. 6–10.

Thus, each container 46 includes an outer container 112 which is adapted to receive a portion of a urine sample. This container 112 may have a cylindrical configuration except that it has a hollow projecting portion 114 at one side for accommodating a valve means 116, and the openings 110 have a configuration which is circular except for a projection to receive the part 114 of each container 112. Thus, the configuration of each opening 110 matches the cross section of the container means 46 at a location just beneath the top flange 118 of the container 112.

Each container 112 carries a funnel means 120 made of any suitable plastic, for example, and having a top flange 122 which extends around the flange 118 with part of the flange 122 having a lower portion 124 which snaps beneath the flange 118 so that the funnel means 120 is fluid-tightly carried by the flange 118 and projects into the interior of the container 112. Part of the flange 122 is formed with a slot 126 which receives the top end of a slidable valve member 128.

The valve means 116 includes in addition to the valve plate 128 an elongated pin 130 which has at one end a head adapted to be pressed upon by an actuating roller, as described in greater detail below. The pin 130 extends through a suitable opening formed in the lower wall of the projecting portion 114, and next to this lower wall, as viewed in FIG. 6, the pin 130 carries a flange 134. A coil spring 136 surrounds the pin 130 above the flange 134, as viewed in FIG. 6, and presses downwardly against the flange 134, with the top of the spring 136 pressing against an interior horizontal projection 138 of the container 112 at the hollow extension 114 thereof. The top of the pin 130 is fixed to the slidable valve plate 128 which is formed with an elongated notch 140 for a purpose referred to below.

The funnel 120 of each container means 46 carries at its bottom end a hollow spiral tube 142 which may be made of any suitable plastic. Thus, when a urine sample is poured into a container portion 112, the sample will flow through the spiral tube 142 into the interior of the container 112 so that when the latter is inverted the urine will not spill out of the container means 46 but will be retained in the container portion 112 by the inner surface of the funnel means 120. In addition, each containe means 46 includes an air tube 144 which extends along the funnel means 120 in the manner shown in FIG. 6, fluid-tightly through the latter into the interior of the container 112. Each tube 144 has an outer open end 146 communicating freely with the outer atmosphere. As a result, when the container 46 is inverted air can flow freely into the interior of the container while the liquid therein flows down to assume the condition shown in FIG. 9.

Each projection 114 of each container 46 fixedly carries an elongated discharge tube 148 having an inner end, in the hollow interior of projection 114 which is slidably engaged by the valve plate 128 so that the inner end of the discharge tube 148 is normally closed. The outer end 150 is situated at the exterior of the container and if desired may carry a plug of cotton or other filtering material.

As each container means 46 is advanced to the receiving station 48, the several container means are of course inverted so that they move together with the lower run of the conveyer means 40, and the heads 132 of the several valve stems 130 are engaged by valve-actuating rollers 152 of a valve-actuating means 154. As is apparent from FIGS. 2 and 3, the valve-actuating means 154 is in the form of an elongated bar 156 which extends between the side frame plates 86, being fixed thereto for example by brackets 160. The bar 158 fixedly carries the depending arms 162 which in turn rotatably support at their lower ends the valve-actuating rollers 152. The location of the aligned rollers 152 is such that when each series of containers 46 reaches the receiving stations 48, the heads 132 will move beneath the rollers 152 which are maintained at the elevation shown in FIG. 2, as well as FIG. 3, and thus the stems 130 will be depressed in opposition to the springs 136, thus locating the notches 140 in alignment with the inner open ends of the discharge tubes 148. As a result the eluate will discharge through the discharge tubes 148 and be respectively received in the aligned series of second containers 50 one of which is shown in FIG. 2. The containers 50 may be in the form of suitable beakers or test tubes.

Thus, in utilizing the apparatus of the invention as described above, a series of clean, dry containers 46 are placed in openings 110 of an elongated plate 106. Then several urine samples are respectively poured into the several containers 46 through the funnel means 120 thereof, and of course suitable identifying indicia are maintained with the samples and with the containers as the samples are treated with the method and apparatus of the invention so that resulting spots on the chromatographic plates will be identified with specific samples initially placed in each row or series of containers 46 carried by a plate 106. Before each plate 106 reaches the eluting station 44 the samples may be poured into the containers carried thereby, this pouring of the samples being done manually, so that in this way each container 46 will carry in its interior the medium which is to receive the eluent.

For this purpose the eluent which is used may be a mixture of alcohol, $NH_4OH$ and chloroform this mixture having an acidity or pH value of between 9 and 9.5, so that with this mixture the eluent will extract any drug present in the urine. Because the eluent is heavier than water, each container 46 which receives the eluent will have in its interior two liquid phases one of which is heavier and being situated beneath the other. Thus, the aqueous phase will float on the eluent phase in which the extracted drug is located. As a result when the several containers 46 are inverted to assume the positions shown in FIGS. 9 and 10, it is the eluent phase which is located at the bottom directly next to the valve means 116, and thus when the several valve means are opened by the valve-actuating means 154, it is only the eluent phase which is received at the receiving station by the several second containers 50 of each series of containers 50 which reaches the receiving station 48.

Figure 11:
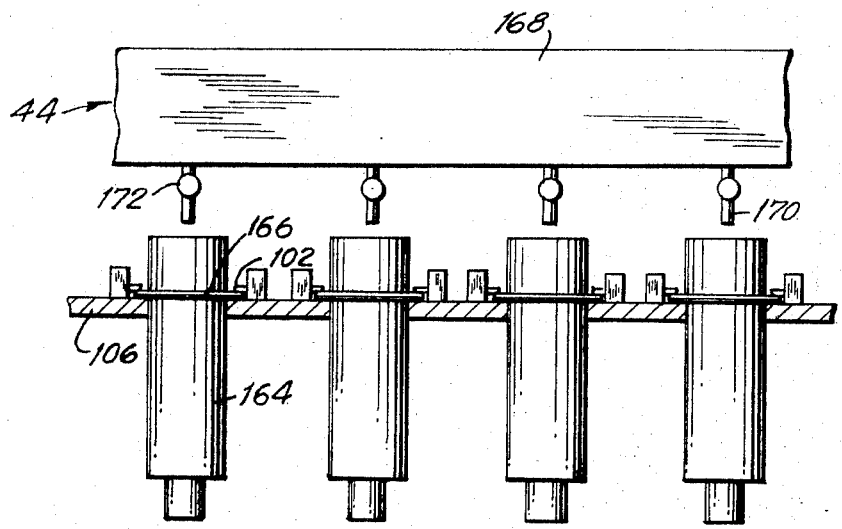
FIG. 11 is a partly sectional fragmentary elevation taken transversely of a second embodiment of a first conveyer means of the invention illustrating how different types of containers are situated at an eluting station, FIG. 11 taken along line 11—11 of FIG. 12 in the direction of the arrows.

FIGS. 11 and 12 illustrate another embodiment according to which the conveyer means 40 carries containers 164 in the form of adsorbing columns as referred to above. In this case the very same brackets 98 are used to carry plates corresponding to the plates 106 but formed with smaller openings through which the columns 164 extend, these columns having flanges 166 resting on the plates 106 and received beneath the spring-pressed pins 102, as shown most clearly in FIG. 11. Thus, in this case also a series or row of containers 164 will reach the eluting station 44 which is shown in FIG. 11 in the form of a suitable container 168 provided with outlets 170 aligned with the several containers 164 which reach the eluting station 44. This same construction is used with the containers 46. The outlets 170 respectively carry solenoid valve units 172 actuated in a manner described below each time a row of containers 46 or 164 reaches the eluting station so that the eluent referred to above is delivered to the medium in the series of containers. With the embodiment of FIGS. 2–10 the medium is a portion of a urine sample while with the embodiment of FIGS. 11 and 12 the medium is the adsorbing substance in each column 164.

With this embodiment before each column reaches the eluting station 44 urine is poured into container 164, and each container is open at its bottom end so that the urine simply flows through each container 164 to be received in a tray 171 which collects the urine and from which the urine may be discarded in any suitable way.

It will be noted that with the embodiment of FIGS. 11 and 12 the eluting station 44 is located over and just ahead of the receiving station 48. As the eluent is delivered to each of the successive rows of containers 164 which reaches the eluting station 44, the eluent flows directly through each column and drops therefrom at the receiving station 48 into a row of containers 50 aligned beneath the receiving station 48. Thus, referring to FIG. 12, it will be seen that the eluting station 44 is just to the left of the containers 50 at the receiving station 48. This horizontal distance between the eluting station 44 and receiving station 48 of FIG. 12 is relatively short so that by the time the eluent flows through the columns these columns will be aligned with the receiving station 48 so that the eluent will be received by the series of containers 50 at the receiving station 48. With this embodiment an operator is located adjacent the left end of the conveyer means 40 to remove the plates 106 from the conveyer means and replace them with the plates which carry new columns 164, and then the urine is poured into these columns before they reach the eluting station 44. In this case also suitable indicia are utilized for identifying the various spots which eventually are on a chromatographic plate so that these spots will be identified with the proper samples.

With the embodiment of FIGS. 2–10, the left shaft 88 shown in FIG. 2 extends through and beyond the pair of side plates 86 to be received in stationary bearings so that the pair of side plates 86 and all of the structure carried thereby are mounted for rocking movement about the left shaft 88 of FIG. 2. The side plate 86 which is shown in FIG. 2 carries a downwardly extending bracket which in turn carries a roller 174 received by a gear 176 carried by a shaft 178 and driven in any suitable way. The result is that this structure 174, 176, 178, forms a shaking means for rocking the pair of plates 86 in the manner indicated by the double-headed arrow 180 shown in FIG. 2 about the left shaft 88 of FIG. 2, so that in this way the several containers 46 are subjected to a shaking action. The shaft 178 is driven intermittently so that the shaking does not occur at the moment when the eluate is transferred to the series of containers 50 at the receiving station 48. Of course, shaking is not required with the embodiment of FIGS. 11 and 12.

Figure 13:
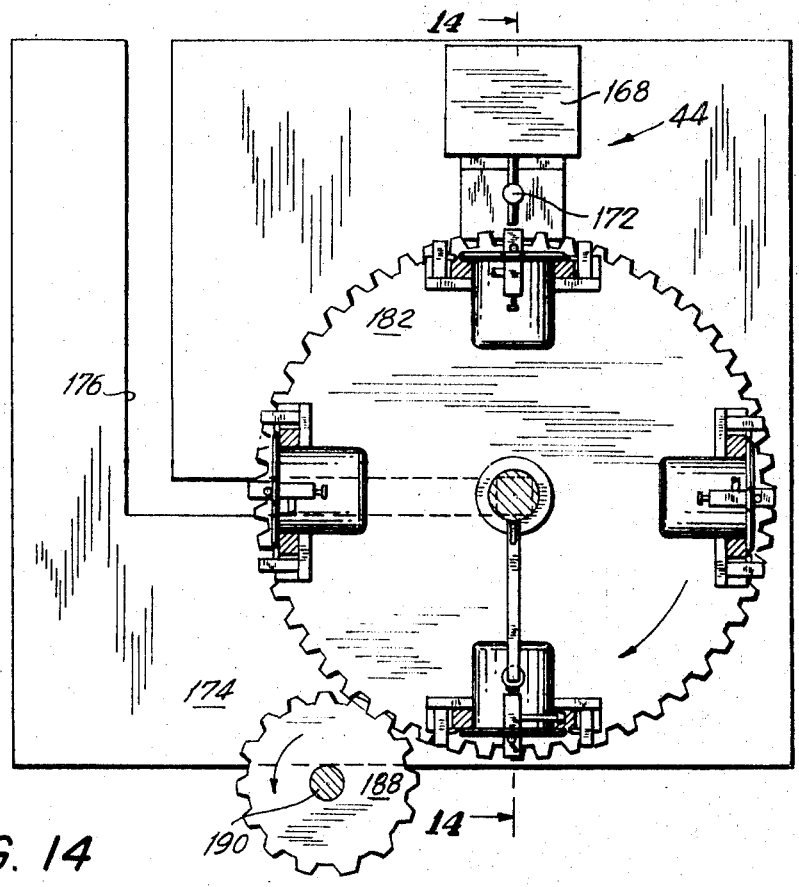
FIG. 13 is a partly sectional elevation of a further embodiment of a first conveyer means of the invention.
Figure 14:
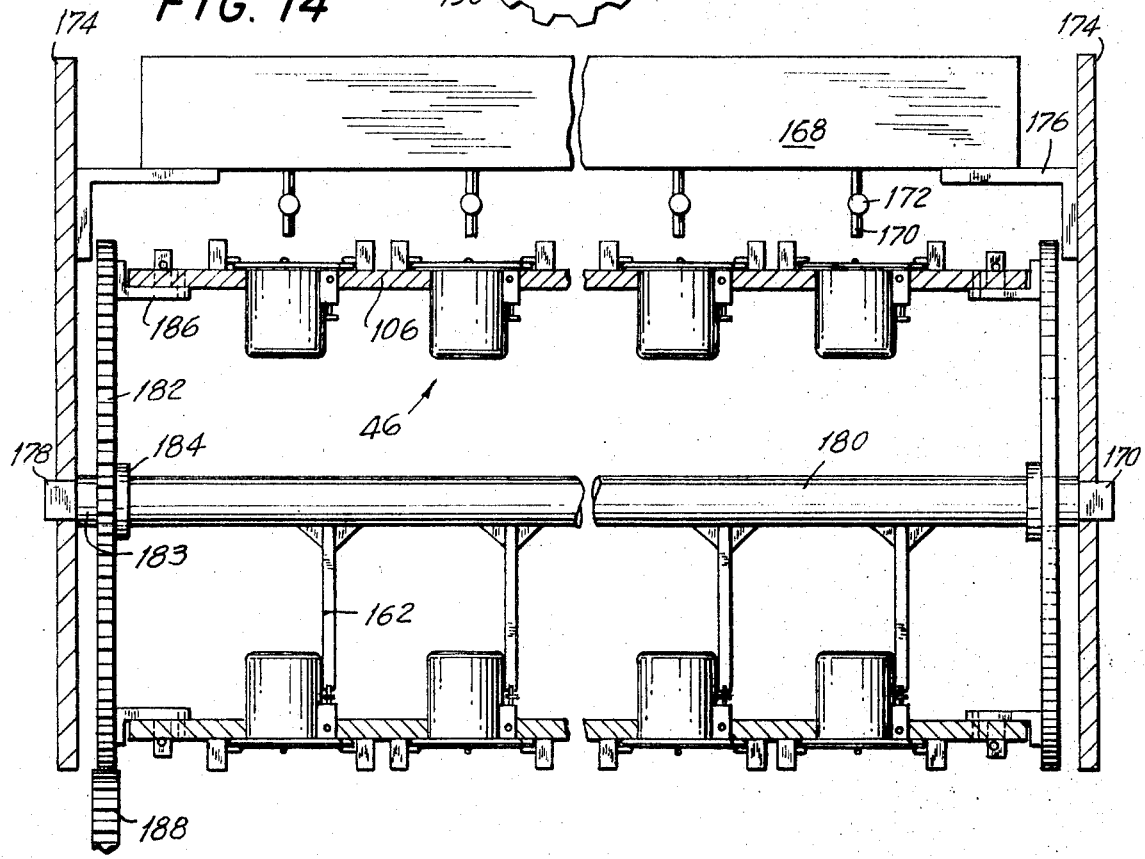
FIG. 14 is a fragmentary sectional elevation of the structure of FIG. 13 taken along line 14—14 of FIG. 13 in the direction of the arrows.

Referring to FIGS. 13 and 14, a further embodiment of the conveyer means 40 is illustrated therein. In this case there are a pair of side frame plates 174 supported in any suitable way in vertical parallel planes. Each of the plates is formed with a slot 176 of L-shaped configuration having a top open end, as is apparent from FIG. 13. These plates 174 respectively carry brackets 176 on which is mounted the tank 168 which is located at the eluting station 44 of this embodiment. This tank 168 is identical with that of FIGS. 11 and 12 and is provided with the outlets 170 respectively having the solenoid valves 172. The slots 176 of the pair of walls 174 are in alignment with each other and are adapted to receive the square ends 178 of a shaft 180 which is of a circular configuration between its square ends 178 and which carries a pair of rotary gears 182. These gears are freely turnable on the shaft 180 and are prevented from moving axially therealong by collars 183 and 184. The pair of identical gears 182 fixedly carry at their inner surfaces which are directed toward each other the L-shaped brackets 186 which are respectively aligned with each other so that these brackets form pairs of aligned brackets which function in the same way as the pairs of aligned brackets 98 described above. These pairs of aligned brackets 186 are adapted to removably carry plates 106 identical with those described above. Also these plates 106 carry identical container means 46, these containers 46 being shown in FIG. 6–10.

As is shown in FIG. 13, one of the gears 182 is driven by a rotary pinion 188 which is itself driven from any suitable transmission. Because the pair of free returnable gears 182 are interconnected with each other by way of the plates 106, they will turn as a unit, and during this turning movement the successive series of containers 46 will become situated at the eluting station 44 to receive the eluent from the tank 168 in a manner described above.

The stationary shaft 180 serves not only to support the gears 182 for rotary movement, but in addition the stationary shaft 180 fixedly carries the downwardly depending arms 162 which respectively carry the rollers 152 which form the valve-actuating means as shown in FIGS. 9 and 10. With this embodiment the receiving station is located directly beneath the lowermost series of containers 46 which are in the inverted position shown at the bottom of FIGS. 13 and 14, and of course in this case the receiving station is situated in vertical alignment with the eluting station 44.

Thus, with the embodiment of FIGS. 13 and 14 it is a simple matter for the shaft 180 and all of the structure carried thereby to be removed from between the pair of plates 174 simply by displacing the ends 178 along the slot 176. Therefore, while one shaft 180 and all of the structure carried thereby is in the position shown in FIG. 14 with the four successive series of containers 46 advancing one after the other to the eluting station 44 and then to the receiving station, another shaft 180 with all of the structure carried thereby is being prepared to replace the unit shown in FIGS. 13 and 14. At this time while the operator places the samples in the several containers 46 at the unit which is about to be put between the plates 174, the unit shown in FIG. 13 is being operated on. It is to be noted that the drive gear 188 may be mounted in such a way that its shaft is carried by a lever which swings about a shaft which carries an unillustrated gear which drives the gear 188, with the lever which carries the shaft 190 shown in FIG. 13 being urged by a spring upwardly toward the gear 182 which is shown in FIG. 13. Thus, the operator can displace the gear 188 downwardly in opposition to this spring in order to introduce the unit into the position shown in FIGS. 13 and 14. Then the gear 188 can be released so that it will be moved by the spring up to the position shown in FIG. 13. Therefore the great advantage of the embodiment of FIGS. 13 and 14 is that there may be on hand several shafts 180 with all of the structure carried thereby so that successive units each of which includes four series of containers 46 may be kept in readiness to be placed successively between the pair of plates 174.

Figure 15:
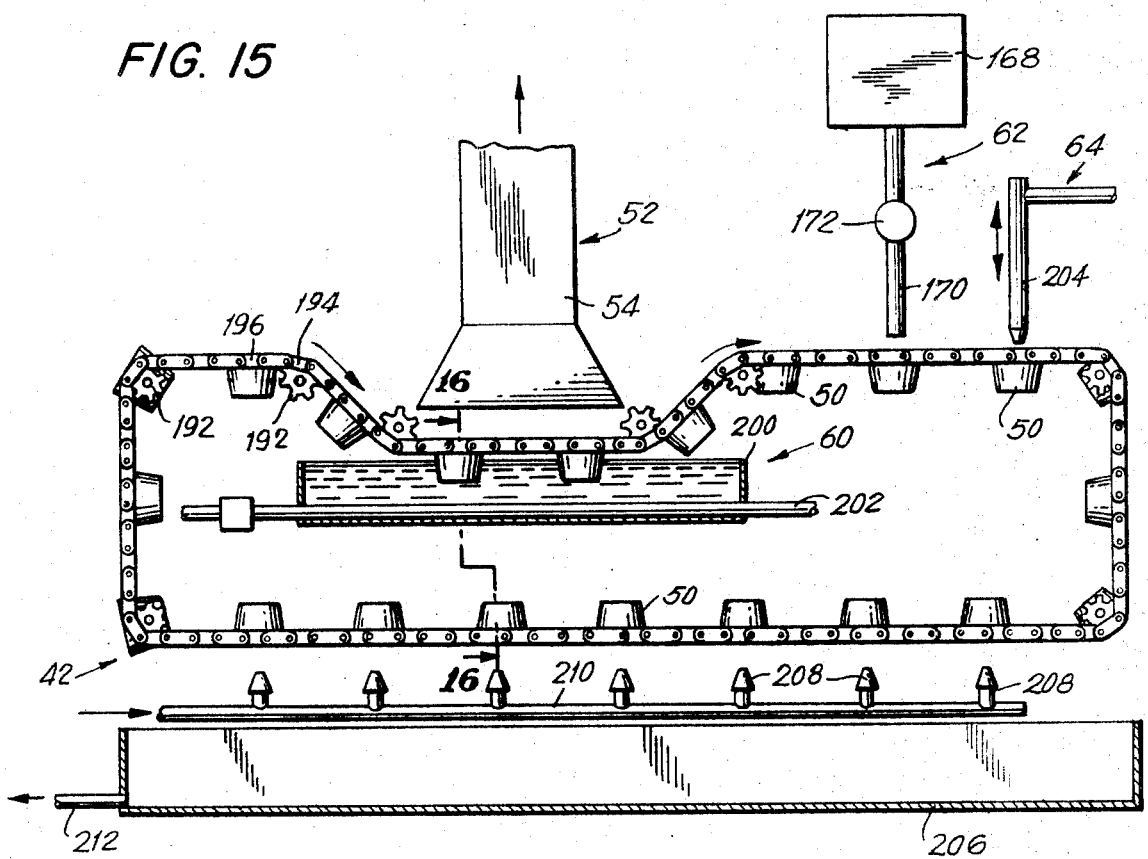
FIG. 15 is a schematic elevation of a second conveyer means and structure associated therewith.
Figure 16:
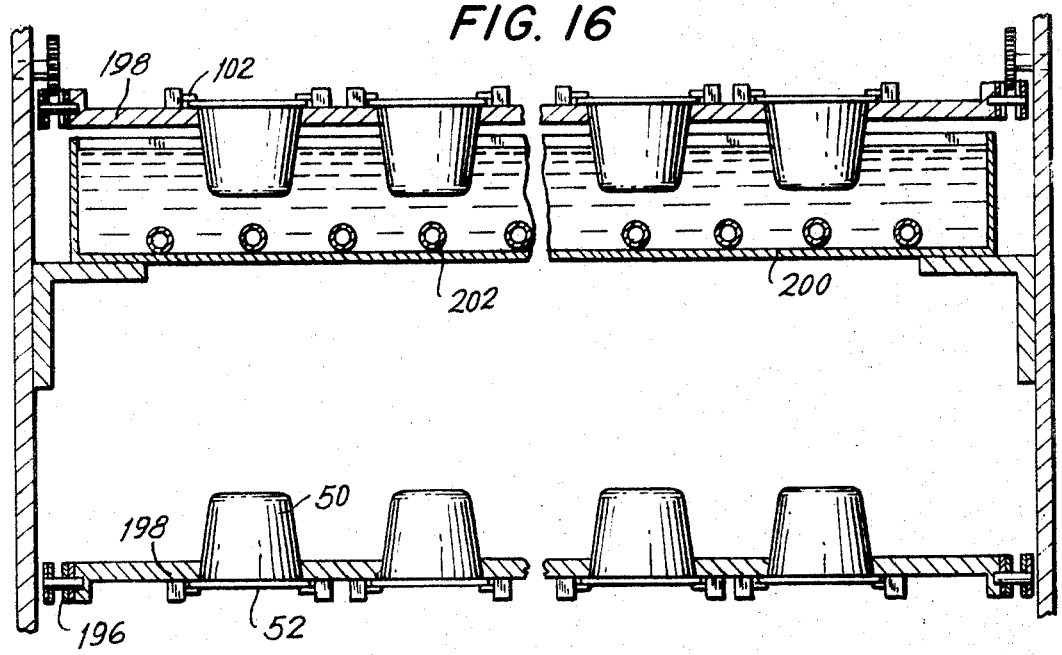
FIG. 16 is a transverse fragmentary sectional elevation of the structure of FIG. 15 taken along lines 16—16 of FIG. 15 in the direction of the arrows and showing the structure at an enlarged scale as compared to FIG. 15.

As was indicated above in connection with FIG. 1, the several series of second containers 50 which receive the eluate at the receiving station 48 are conveyed by the second conveyer means 42 from the receiving station 48 to the evaporating station 52 and from the latter first to a solvent station 62 and then to a removing station 64. The details of this part of the structure of the invention are illustrated in FIGS. 15 and 16 partly in a schematic manner in that the solvent and removing stations are shown in FIG. 15 closer to each other and closer to the evaporating station than they are in the actual structure. This is done solely for the sake of convenient illustration and it is to be understood that these stations are spread further apart from each other than is apparent from FIG. 15, somewhat along the lines illustrated in FIG. 1.

As is apparent from FIGS. 15 and 16, the conveyer means 42 actually takes the form of a series of sprocket pairs 192 carried by rotary shafts 194 which are supported for rotation by any suitable framework, and any one of these shafts 194 extends outwardly beyond the pair of sprockets 192 which it carries and is fixed to a drive gear which is driven in a manner described in greater detail below. Distributed along each endless chain 196 of the conveyor means 42 are links which have the pins thereof extended so that these pins carry the plates 198 which extend between the pair of chains 196 in the manner shown most clearly in FIG. 16. Each of the plates 198 is formed with a row of openings which receive the containers 50 which have flanges 52 engaged beneath spring pressed pins 102 in a manner described above. In this way each plate 198 carries a series of second containers 50 which are adapted to become respectively aligned beneath the successive series of containers 46 or 164 described above.

The arrangement of the sprockets 192 is such that after each series of containers 50 moves beyond the receiving station 48, they are directed downwardly to the evaporating station 52 and then move horizontally at the evaporating station where the suction hood 54 is located. Beneath the suction hood 54 is the heating means 60 referred to above in connection with FIG. 1. The heating means 60 includes a pan 200 which contains a body of water capable of being heated by way of suitable heating rods 202 which are connected with any suitable source of electric current so that these rods 202 will heat the water within the pan 200 of the heating means 60. Instead of electrical heating elements 202 it is possible for the elements 202 to take the form of steam pipes which receive hot steam which are used to heat the water within the pan 200. As is apparent from FIGS. 15 and 16, the arrangement of the sprockets 192 at the region of the evaporating station 52 is such that the successive series of containers 50 are moved downwardly into the hot water and then upwardly out of the latter, so that as a result of this arrangement the eluate is heated and evaporated to relieve the residue in the series of containers 50.

Then the series of containers 50 reach the solvent station 62. At this solvent station is located another tank 168 having the outlets 170 provided with the solenoid valves 172, this structure being identical with the structure at the eluting station 44. The several solenoid valves 172 are actuated at the proper time to release solvent from the tank 168 into the several series of containers 50, and thus the residue is dissolved in a suitable solvent which, if desired, may be the same substance as that used for eluting at the eluting station 44.

Therefore, with the several residues in each series of containers 50 dissolved in the solvent supplied at the solvent station 62, the containers 50 are advanced beyond the solvent station 62 to the removing station 64 where the capillary tubes 204 are located, these tubes forming the removing means 66 as described above. In a manner which is described in greater detail below the several series of tubes 204 are dipped into the solvent to remove part of the solvent and the residues dissolved therein from the several containers 50, and then these tubes are transferred to the spotting station for spotting the chromatographic plates.

As may be seen from FIG. 15, when the several containers 50 move beyond the removing station 64, they become inverted and located over a collecting pan 206 into which the remaining solvent spills. At the same time they move over the jets 208 which are supplied with hot water, for example, from any system of tubes 210 which communicates with a source of hot water, and these jets direct the hot water up into the interior of the inverted containers 50 with any excess water also being collected in the pan 206 from which the washing liquid is discarded through a drain pipe 212. The several containers 50 are in a dry condition by the time they reach the receiving station 48, so that in this way the conveyer means 42 serves to advance the containers 50 in the manner shown in FIG. 15 from the receiving station to the evaporating station 52, from the latter to the solvent station 62, and from the latter to the removing station 64, before the containers are returned to the receiving station with the containers being washed and dried as they move with the bottom run of the conveyer means 42 in a manner described above.

As has been indicated above, the removing means 66 is formed by a series of capillary tubes 204, and the details of the removing means as well as the details of the arrangement of the spotting station 72 are illustrated in FIGS. 17–25.

Referring to FIG. 17, there is shown therein a stationary plate 214 which forms part of the stationary framework of the apparatus, and this plate 214 is formed with an opening through which a rotary drive shaft 216 extends. The shaft 216 is driven by way of a gear 218 which meshes with a gear 220 driven in a manner described in greater detail below.

The plate 214 fixedly carries L-shaped arms 222 which serve to support a bearing 224 which guides the shaft 216 for rotary movement. The shaft 216 fixedly carries a collar 226 which rests on the top end of the bearing 224 so as to locate the shaft 216 in the vertical direction. As is apparent from FIG. 24, the bearing 224 fixedly carries horizontal arms 228 which fixedly carry at their outer ends solenoids 230 for a purpose referred to below.

The shaft 216 is fixed at its top end to the bottom wall of a rotary chamber 232 which is situated beneath and communicates fluid-tightly with the interior of a suction chamber 234. The chamber 232 is formed in its interior with the compartments 236 each of which extends through 90° between the outer wall 238 of the rotary chamber 232 and the inner wall 240 thereof. The outer wall 238 fixedly carries four groups of tubes 242 with each group of tubes 242 communicating with the interior of a chamber 236. These groups of tubes 242 rotate together with the rotary chamber 232. At their outer ends the tubes 242 are connected with flexible tubes 244 which in turn are connected with the top ends of the capillary tubes 204.

The suction chamber 234 has the configuration shown most clearly in FIG. 19 from which it is apparent that the suction chamber 234 has in its interior a pair of compartments 244 and 246 which communicate with suction tubes 248 which in turn are connected to any suitable source of suction, while these chambers 244 and 246 are separated from each other by an intermediate chamber 250 which does not communicate with any source of suction.

As is apparent from FIG. 17, flexible tubular portions in the form of rubber tubes 250 or the like serve to interconnect the rigid tubes 242 with the capillary tubes 204, respectively. As is shown most clearly in FIG. 21, each group or series of capillary tubes 204 is carried by a T-shaped support tube 252 which has an outer arm formed with openings through which the several capillary tubes 204 extend with these tubes being carried in any suitable way on the arm 254 of the support 252. The shaft 216 fixedly carries four brackets 256 which are spaced by 90° apart from each other about the shaft 216 while being fixed thereto, and these brackets 256 fixedly carry hinges 258, respectively, by means of which the several supports 252 are hingedly connected to the brackets 256. The hinge or support structure 252 carries a pin 260 while each bracket 256 carries a pin 262, and a spring 264 extends therebetween for urging the several support elements 252 up to a horizontal attitude in which they are shown in solid lines in FIG. 17. However, the solenoids 230 are energized in a manner described below so as to attract armatures 266 fixedly carried by each of the supports 252, and thus when the left solenoid 230 of FIG. 17 is energized, for example, the armature 266 will be attracted to cause the support 252 to swing downwardly to the dot-dash line position shown in FIG. 17 in opposition to the spring 264. This is the action which takes place whenever the solenoids 230 are energized so that at the removing station the left support 252 will be swung downwardly while at the spotting station the lower support 252, as viewed in FIG. 21 will be swung downwardly, and at the washing station which is opposed to the removing station the support will be swung down as shown at the right of FIG. 17 so that the several capillary tubes will dip into the washing liquid 268 located in a suitable tank 270.

Figure 21:
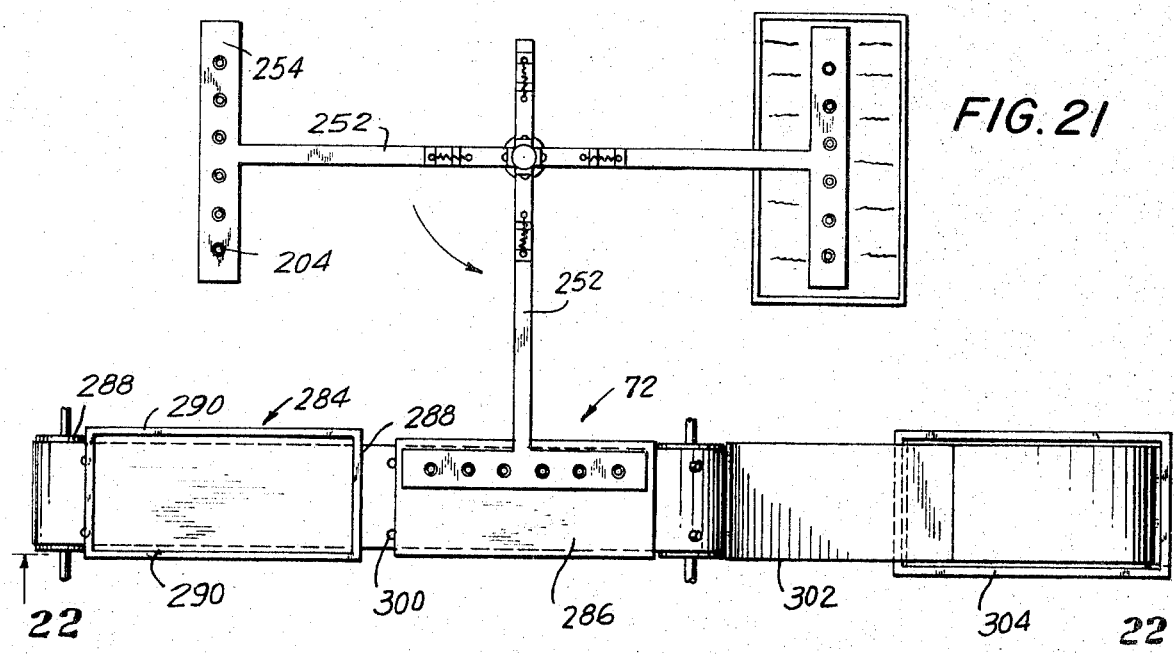
FIG. 21 is a schematic plan view taken along line 21–21 of FIG. 17 in the direction of the arrows and showing details of the removing, spotting, and washing stations.

With the above arrangement it is apparent that when a support 252 locates the capillary tubes 204 at the removing station, the several tubes 242 will communicate with the chamber 244 through one of the chambers 236 shown in FIG. 18, and the suction is such that not only will part of the solvent be drawn in through capillary action but it will be reliably maintained in the capillary tubes as a result of the suction which is adjusted to be just strong enough to hold in each capillary tube the solvent which is drawn into the latter. Then, during the next rotation the tubes which have withdrawn some of the solvent will be located at the spotting station, and at this time the several tubes 242 communicate with the chamber 250 which is not under suction, so that when the front solenoid 230 is energized to draw the forwardly extending support 252 downwardly, with this being the lower support 252 shown in FIG. 21, the bottom ends of the tubes 204 will be placed in engagement with a chromatographic plate 272 which is illustrated in FIG. 21, so as to provide the required spots on the chromatographic plate. Then from the time each support 252 and the capillary tubes carried thereby reach the washing station shown at the right of FIG. 21 until they return to the removing station the tubes 242 are in communication with a source of suction so that not only is the washing liquid 268 drawn through the tubes to wash the same but in addition when the tubes move beyond the washing station the air continues to be drawn into the tubes in order to dry the same so that dry clean tubes are available by the time the tubes return to the removing station.

FIG. 20 illustrates an embodiment which differs from that of FIGS. 17-19 in that the rotary component 274 which is fixed to the top end of the shaft 216 and which is fixed to tubes 242 arranged in the same way as those shown in FIGS. 17 and 18. However in this case the rotary chamber 274 communicates fluid-tightly with a single suction chamber 276 which communicates through a tube 278 with any suitable source of suction, so that with this embodiment the tubes carried by the arms 252 are always in communication with a source of suction. This construction of FIG. 20 is used with a different embodiment of the invention as described in further detail below.

Referring to FIG. 25, there is shown therein part of an arm 254 with a capillary tube 204 carried thereby. The capillary tube extends through an opening of the arm 254 and is connected at its top end to the flexible hose or tube portion 250. Each capillary tube 204 is provided with a flange 280 which engages the top surface of the arm 254.

Also it will be noted that each capillary tube 204 is formed just below the arm 254 with an opening 282 so that through this opening the interior of the tube 204 communicates with the outer atmosphere. Thus, with the suction applied to the interior of each capillary tube 204 in the manner described above, the solvent will be drawn in up to the air inlet opening 282 and will be maintained in the tube 204 as the latter is displaced up to the spotting station and then beyond the latter to the washing station. During washing, as shown in FIG. 17, the liquid 268 will be sucked up into each capillary tube 204 until the washing liquid reaches the air opening 282, and in this way the extent to which each capillary tube is filled with liquid is limited. Thus, the washing liquid will not be sucked up into the rotary unit 232 and cleaning of the interior of each capillary tube 204 will take place throughout the part thereof which receives the solvent at the removing station. When the capillary tubes move beyond the washing station shown at the right of FIG. 17, the continued suction will dry the interiors of the tubes.

Figure 22:
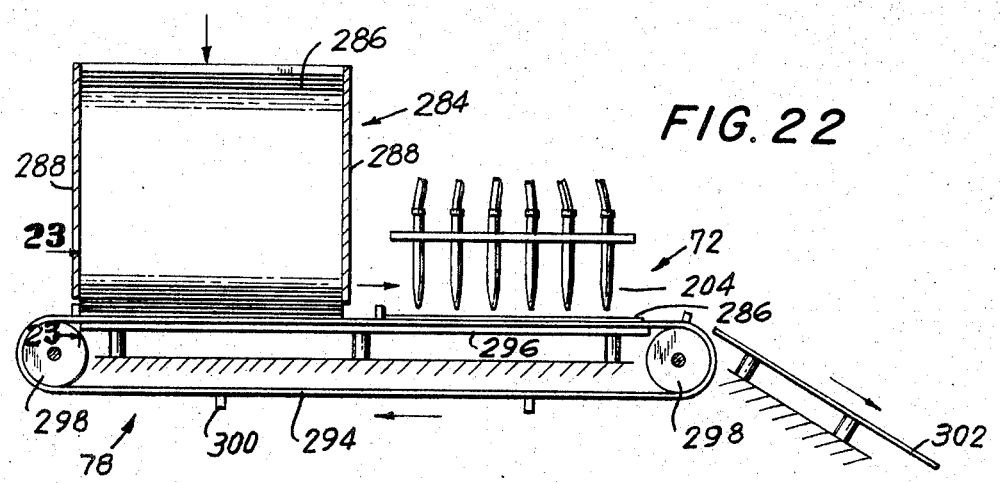
FIG. 22 is an elevation taken along line 22—22 of FIG. 21 in the direction of the arrows and showing details of a third conveyer means and how it serves to convey chromatographic plates to and beyond a spotting station.
Figure 23:
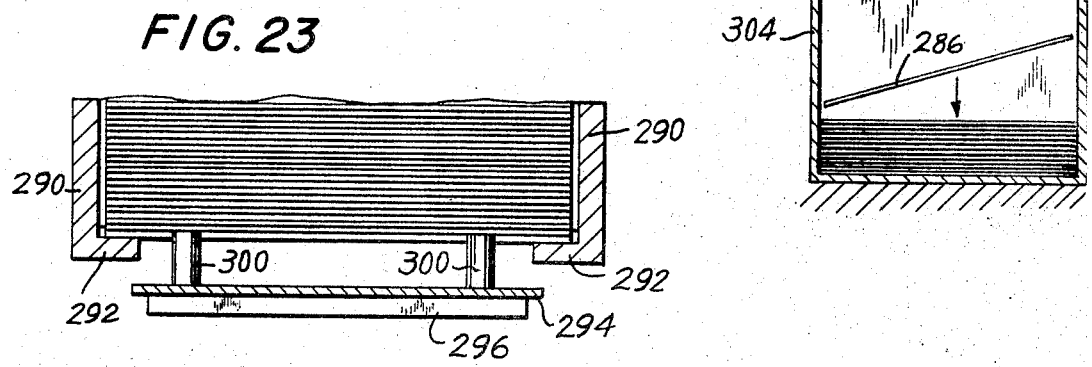
FIG. 23 is a fragmentary sectional elevation taken along line 23—23 of FIG. 22 in the direction of the arrows and illustrating how successive chromatographic plates are removed from a magazine by the conveyer means of FIG. 22.

Referring to FIGS. 21-23, the details of the spotting station are illustrated therein. Thus, it will be seen that just ahead of the spotting station is located a magazine means 284 in the form of a suitable container in which a tack 286 of chromatographic plates are located one above the other. The magazine means 284 is in the form of a verticle container having front and rear walls 288, shown in FIG. 22 and side walls 290, shown in FIG. 23. The container for the plates 286 is open at its top and bottom so that additional plates 286 can be introduced through the top of the container 284 as required. Any suitable supporting structure is connected with the magazine means 284 for supporting the latter. As is apparent from FIG. 23, the side walls 290 are respectively provided with inwardly directed flanges 292 which support the stack of plates 286.

At the spotting station is a third conveyer means 78 shown schematically in FIG. 1 and illustrated in detail in FIG. 22, the chromatographic plates 286 corresponding to the plates 74 shown in FIG. 1. The conveyer means 78 includes an endless flexible belt 294 having its top run supported by a suitable stationary plate 296 which is situated beneath the top run of the belt 294, this belt being supported by front and rear rollers 298 one of which is driven in any suitable way. At regular intervals the belt 294 fixedly carries pins 300 which are arranged in pairs which are aligned transversely with respect to the belt 294. A pair of the pins 300 which are transversely aligned are illustrated in FIG. 23. As is apparent from FIG. 23, the top ends of each pair of aligned pins 300 are situated at such an elevation that they will engage the lowermost chromatographic plate 286 and displace the latter to the right, as viewed in FIG. 22 out of the magazine means 284 while the remaining plates 286 will remain in the magazine means so that when the next pair of pins 300 reach the magazine means they will displace the plate 286 which is then located at the bottom of the stack out of the magazine means 284. In this way successive plates 286 are displaced by the conveyer means 78 out of the magazine means 284 to be carried with the belt 294 to the spotting station 72 where a group of the capillary tubes 204 with the solvent therein are situated directly over each plate 286 which arrives at the spotting station. When the solenoid 230 shown at the lower part of FIG. 24 is actuated, the tubes 204 shown in FIG. 22 will be displaced downwardly to engage with their bottom ends the plate 286 which is at the spotting station, and in this way a row of spots are provided to give an indication of the drug in the urine.

As the belt 294 continues to turn, the plate 286 which was previously at the spotting station is moved beyond the spotting station and falls off the right end of the belt 294, as viewed in FIG. 22. This plate which is advanced beyond the right end of the belt 294 is guided by a stationary downwardly inclined plate 302 into a collecting container 304 in which a stack of plates 286 with spots thereon are accumulated. These containers 304 are removed from time to time as they become filled with the chromatographic plates.

The plates which are thus collected in the containers 304 will be identified through suitable indicia so that the spots can be identified with specific urine samples from specific individuals.

The same urine samples from these individuals can be tested as by a colorimeter or other automatic type of electronic spectrographic instrument to achieve an independent indication of which drug if any is contained in a given urine sample, and this latter determination of the presence of a drug may be used to confirm the indications given by the spots placed on the chromatographic plates with the arrangement of the present invention.

As was indicated above, FIG. 20 shows a construction used in connection with a different embodiment of the invention. This embodiment is identical with that described above except that instead of the enclosure 232 and the chambers therein the groups of tubes 242 are connected to a rotary chamber 274 which has its entire interior communicating with the single stationary chamber 276 which communicates through the tube 278 with the source of suction. The chamber 274 is carried at its bottom wall by the top end of the rotary shaft 216, in the same way as the chamber 232. Thus, with this embodiment the construction is considerably simplified, and the only difference in the operation is that suction is continuously maintained in all of the capillary tubes. However this degree of suction provided with the embodiment of FIG. 20 is weaker than that of FIGS. 17–19 and at the same time even though a slight suction acts on the tubes 204, they can be depressed at the spotting station by actuation of the spotting electromagnet 230 in order to produce spots on the chromatographic plates.

According to a further embodiment of the invention, simple capillary tubes which do not communicate with any source of suction but which have bores small enough to provide sufficient capillary action in themselves are utilized in such a manner that these tubes can be discarded and replaced by new tubes. This embodiment of the invention is illustrated in FIGS. 26–31. With this embodiment of the invention only two electromagnets 230 are required, these being the left and lower electromagnets shown in FIG. 24. Thus, the electromagnet 230 utilized in connection with the removing station and the electromagnet 230 utilized in connection with the spotting station are maintained, while the third electromagnet is omitted.

Figure 28:
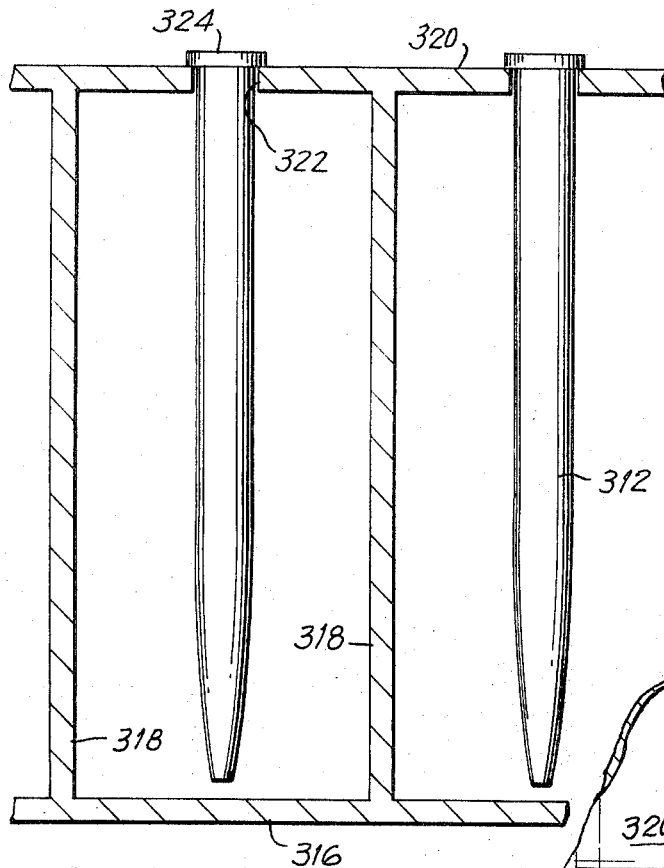
FIG. 28 is a fragmentary transverse sectional view on an enlarged scale as compared to FIG. 26 showing details of the capillary tubes supply means of FIG. 26.

Referring to FIG. 26, the structure illustrated therein is located at the side of the shaft 216 which is diametrically opposite the lower electromagnet 230 shown in FIG. 24, this being the electromagnet which is located at the spotting station. Thus, diametrically opposed to the spotting station is a supply station 310 for supplying capillary tubes 312 to the successive arms 254 of the successive supports 252 which are arranged in the same way as illustrated in FIG. 21. Thus it will be understood that there are four supports 252 angularly displaced from each other by 90° by the axis of the shaft 216, each of these supports having the arms 254 formed with the openings which carry a number of capillary tubes corresponding to the number of containers from which solvent is to be removed at the removing station. At the tube supply station 310 is a magazine means 314 which is inclined as illustrated in FIG. 26 and which is provided with a bottom wall 316 and a plurality of upright parallel walls 318 two of which are shown in FIG. 28. It will be understood that these walls 318 define between themselves a number of channels in which rows of capillary tubes 312 are located one behind the other. Each of the upright walls 318 is fixed at its top end to a flange 320 which is parallel to the bottom wall 316, and these flanges are spaced from each other to define between each pair of adjoining walls 318 an elongated slot 322 through which a row of tubes 312 extends. These tubes have at their top ends flanges 324 which rest on the flanges 320, the inclination of the magazine means 314 being such that the rows of capillary tubes gravitationally slide down to the position shown for the lowermost tube in FIG. 26.

Figure 29:
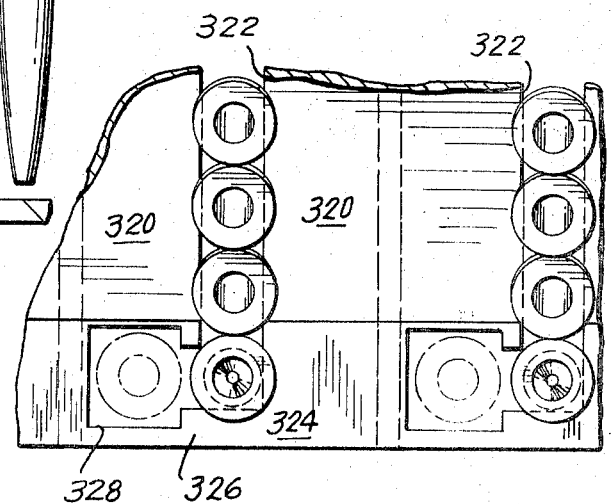
FIG. 29 is a top plan view of the supply means showing fragmentarily the discharge end where the capillary tubes are removed from the supply means by each carrier means.

As is apparent from FIGS. 26 and 29, the lower ends of the flanges 320 are joined with a horizontal elongated narrow wall portion 324 which extends across the front of the magazine means 314. The several slots 322 defined between the flanges 320 communicate at their bottom ends with lateral slot extensions 326 which are formed in the elongated narrow end wall portions 324. Thus, the lowermost tubes 312 of each row of tubes is situated at the bottom end of a slot 322 where the latter joins the lateral extension 326. Each of the lateral extensions 326 has beyond the location where it joins the slot 322 an enlarged end portion 328 which is sufficiently greater in area than the outer diameter of the flange 324 to enable the tubes 312 to fall through these portions 328 when they reach the portions 328.

As is shown in FIGS. 26 and 27, a cam means 330 is situated in the path of movement of the supports 252 and their arms 254 which for the time being are assumed to be empty of any capillary tubes. The cam 330 extends perpendicularly with respect to the shaft 216 at a location which is diametrically opposed to the spotting station, as pointed out above. As each support 252 approaches a location diametrically opposed to the spotting station, each support 252 engages the lower, inclined camming surface 332 of the cam 330 which is supported in any suitable way, and as a result each of the supports 252 is lowered, in opposition to the spring 264, each of the supports 252 being swung downwardly by the cam 330 until the tube carrying portion 254 is beneath the row of capillary tubes 312 which extend vertically from the lower ends of the slots 322 at the elongated narrow wall portion 324. The end 334 of the cam 330 extends vertically and is situated at such a location but as soon as the left edge 336 of each support 252, as viewed in FIG. 27, reaches the edge 334, the spring 264 contracts and swings each support 252 back up to its horizontal position, and at this time the openings of the arm 254 are respectively aligned with rows of capillary tubes 312 so that the latter are received in these openings. Then, during the continued turning of the shaft 216 and the supports 252 therewith slightly beyond the location where the capillary tubes 312 are received in the openings of an arm 254, these tubes 312 are all simultaneously shifted into the larger portions 328 of the lateral slots 326 so that the several tubes fall through the openings 328 and rest with their flanges 324 on the top surface of the transverse arm 254 of each support 252. As soon as one group of tubes 312 have been removed in this way from the magazine means 314, the next row slides down to the ends of the slots 322 where they respectively join the slots 326, and in this way all of the rows of inclined tubes in the magazine means advance downwardly so that as soon as one row of tubes is removed by an arm 254 a next row automatically becomes situated by gravity at a location to be received in the openings of the next arm 254 which reaches the tube-supply station 310. Thus, with this construction all that the operator need do is maintain supplies of tubes occupying the inclined slots 322, and these tubes will be automatically picked up by the several supports 252 as they reach the supply station 310.

These purely capillary tubes will then reach the removing station where the electromagnet 230 at the removing station will be energized to lower each support and the capillary tubes 312 carried thereby so that the bottom ends of these tubes dip into the solvent in the several containers 50 at the removing station 64, and solely by capillary action a given amount of solvent is sucked up into each of the capillary tubes 312. The latter tubes are then transported to the spotting station where the electromagnet at the spotting station is actuated to apply the bottom ends of the several tubes to a chromatographic plate precisely in the manner described above so as to deposit spots on each chromatographic plate, with these spots being handled in precisely the manner described above.

Figure 30:
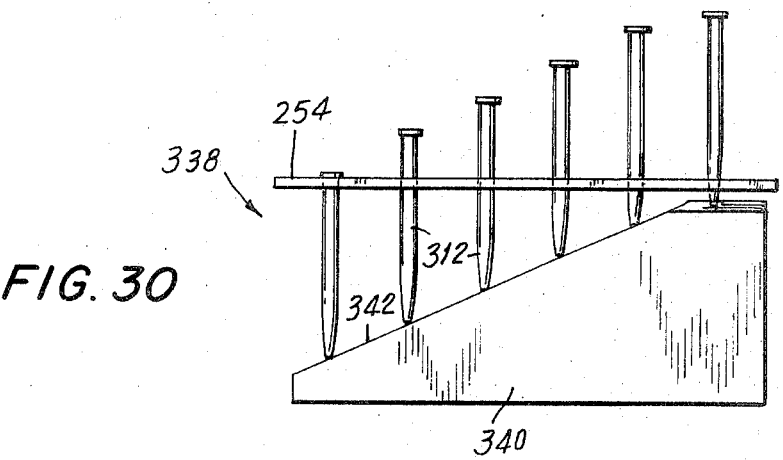
FIG. 30 is a schematic representation of a cam means for discarding previously used capillary tubes.

As has been pointed out above, the capillary tubes 312 are simple inexpensive tubes which operate solely by way of capillary action, and these tubes are intended to be discarded after they are used once, so that a washing station is not required. Therefore, instead of a washing station provided with a pan 270 and the washing liquid 268, as shown in FIG. 17, there is located, at the side of shaft 216 diametrically opposed to the removing station, a discarding station where the previously used capillary tubes 312 are discarded. This construction is shown in FIG. 30. Thus, referring to FIG. 30 it will be seen that at the tube-discarding station 338 there is supported, in any suitable way, a discarding cam 330 which has an upper inclined camming surface 342. The inclination and elevation of the camming surface 342 is such that as each arm 254 moves to the right, as shown by the arrow 344 in FIG. 30, the bottom ends of the tubes 312 which have been moved beyond the spotting station engage the surface 342 and the tubes 312 are successively raised with respect to the arm 254 until the lowered tapered ends of the tubes 312 reach the elevation shown at the right in FIG. 30. At this elevation the tubes are unstable and simply fall out of the openings of the arms 254 while the latter continue to move beyond the discarding station 338 to the supply station 310. The falling tubes 312 are received in any suitable receptacle situated beneath the cam 340, and when a sufficient number of discarded tubes have been collected in such a receptacle, the latter is removed and replaced by an empty receptacle.

Thus, with this relatively simple embodiment which utilizes capillary tubes 312 which can be discarded, the structure operates in a fully automatic manner to receive new tubes from the supply means 314 and to discard the used tubes at the discarding station 338.

FIG. 31 is a view of the discarding station 338 as seen from the left of FIG. 30. FIG. 31 shows schematically a suitable receptacle 346 for receiving the discarded tubes 312. Also FIG. 31 shows that the camming surface 342 not only is inclined upwardly as viewed in FIG. 30 so as to raise the several tubes 312, but in addition the camming surface 342 is inclined downwardly toward the right, as viewed in FIG. 31, so that the tubes 312 will tend to fall toward the right down into the receptacle 346, although if any of the tubes should happen to fall to the left, as viewed in FIG. 31, they will also be recieved in the receptacle 346.

Thus, after each arm 254 moves beyond the discarding cam means 340, it no longer carries any of the capillary tubes 312 and is in a condition to receive a set of new capillary tubes 312 in the manner described above.

As has been indicated above, all of the various components of the entire system are operated in properly timed relation. One possible system for operating the various components in properly timed relation is illustrated in FIGS. 32 and 33. Thus, referring to FIG. 32 it will be seen that the energy for operating the system of the invention may be derived from the electrical lines 348 of the public utility, one of these lines carrying a master switch 350 which may be closed to turn the entire apparatus on or opened to turn the entire apparatus off. The lines 348 are electrically connected to a single driving motor 352 which through a suitable gear reduction rotates a driving gear 354 which in turn meshes with a rotary gear 356. The gear 356 meshes with a gear 358 which in turn meshes with an idler 360 which serves to transmit the rotation of the gear 358 to the gear 362 which thus rotates in the same direction as the gear 358. These gears 358 and 362 are respectively fixed coaxially to sprockets 364 and 366 which thus rotate together with the gears 358 and 362. The sprockets 264 and 366 serve to drive endless chains 368 and 370. The chain 370 serves to drive an unillustrated sprocket fixedly carried by one of the shafts 88 so as to drive the conveyer means 40. However, in connection with the embodiment of FIGS. 13 and 14, the unillustrated sprocket driven by the chain 370 is fixed to an unillustrated gear which meshes with the gear 188 shown in FIG. 13. It is around the axis of this unillustrated gear that the shaft 190 can be swung in opposition to an unillustrated spring when the conveyer unit of FIGS. 13 and 14 is to be removed from the slots 176 and to be replaced therein.

The chain 368 drives an unillustrated sprocket fixed to any one of the shafts which carries a pair of sprockets 192 which serve to drive the endless chain 196 shown in FIG. 15.

The gear 356 also serves to drive a gear 372 which is fixed coaxially to a sprocket 374 which drives a chain 376. This chain 376 drives an unillustrated sprocket fixed to a shaft which carries the left roller 298 of FIG. 22, so that in this way the drive is transmitted to the third conveyer means 78. Therefore, all of the conveyer means 40, 42, and 78 are simultaneously operated in the manner described above.

The gear 372 meshes with a further gear 378 coaxially fixed to a sprocket 380 which serve to drive the endless chain 382. This chain drives a sprocket 384 which in turn drives the bevel gears 386 so as to rotate the shaft 388 which is fixed to a driving pinion 390. The pinion 390 drives a gear 392 which is coaxially fixed with a segmental gear 394 which periodically rotates the gear 220 which meshes with the gear 218, as shown in FIG. 17. The segmental construction of the gear 394 is apparent from FIG. 33. Thus, while the gear 394 will continue to rotate, the gear 220 will have periods of rotation followed by periods of dwell, and the relationship between the gears of this transmission is such that the four supports 252 will be turned through increments of 90° which alternate with dwell periods determined by that part of the segmental gear 394 which is not provided with any teeth. Thus, the several supports 252 will be turned in a stepwise manner through increments of 90°, and it is while the supports 252 are stationary, during the dwell periods, that the solenoids 230 are energized.

For the purpose of energizing the several solenoids 230 as well as the several solenoid valves 172, the gear 378 meshes with a further gear 396 which is coaxially fixed with a sprocket 398 which drives an endless chain 400. This chain 400 carries a plurality of supports 402 which are distributed along the chain 400 for movement therewith and which respectively carry the bridging contacts 404 which are insulated from the supports 402 in any suitable way. These bridging contacts 404 will successively bridge the pairs of contacts 406 and 408. Upon bridging a pair of contacts 406, all of the solenoid valves 172 will be momentarily energized as each bridging contact 404 moves across the contacts 406, the period of energizing of all of the solenoid valves 172 lasting only during the time that both contacts 406 are bridged by a contact 404. Only one of the solenoid valves 172 is shown in the schematic arrangement of FIG. 32, but it is to be understood that all of the solenoid valves are connected in parallel to be simultaneously energized in the manner shown for the solenoid valve 172 in FIG. 32.

In the same way the contacts 408 are bridged by the successive bridging contacts 404 so as to simultaneously energize the several electromagnets 230 which are also connected in parallel in the manner shown for the single solenoid valve 230 illustrated in FIG. 32.

It is to be understood that the structure is shown in FIGS. 32 and 33 in a purely schematic manner. The positions of the supports 402 along the chain 400 is adjustable so that on the one hand the solenoids 230 are energized during a time when the gear 220 is stationary and on the other hand the solenoid valves 172 are energized so that on the one hand eluent will be properly delivered at the eluting station 44 to the successive rows of first containers 46 while on the other hand the solvent will be delivered at the solvent station 62 at the proper time to the successive rows of second containers 50.

All of the above-described structure of the invention can be combined together into a single unitary appliance which can be readily carried by a single individual of average strength so as to be placed at a suitable location for operation and which can be suitably plugged into any wall outlet for connection to the lines 348. Then it is only required to open and close the switch 350 in order to stop and start the operation of the entire system. Of course, the operator will provide the first containers with the medium therein to receive the eluent at the eluting station, as described above, and the operator will see to it that there is on hand a supply of chromatographic parts. The first containers will be provided in groups of four rows with the embodiment of FIGS. 13 and 14, while with the embodiment of FIGS. 26–31 the operator will also maintain the magazine means 34 supplied with a reserve of capillary tubes 312. All of these operations can be readily performed by a single operator so that the structure of the invention is easily operated by only one operator.

What is claimed is:

1. In a method for testing a plurality of urine samples to determine the presence of a drug such as narcotic analgesics, amphetamines, and addictive sedatives, the steps of first pouring a plurality of urine samples respectively into a series of first containers for providing in said first containers a series of mediums, respectively, which are adapted to receive an eluent, arranging said first containers respectively at locations where they are adapted to receive eluent simultaneously, pouring a given amount of an eluent which will elute at least said drug respectively into the series of first containers simultaneously for extracting said drug, if any, from the mediums respectively located in said series of first containers, simultaneously transferring the eluate from said series of first containers respectively into a series of second containers, simultaneously evaporating the solvent from said second containers to leave residues in the latter, simultaneously adding additional solvent to said residues in said second containers, simultaneously removing from said second containers a small portion of the solvents and residues dissolved therein, then simultaneously spotting a chromatographic plate with said removed solvents and the residues dissolved therein, and repeating the above steps to obtain a plurality of chromatographic plates each with a series of spots thereon, and repeating the above steps in a sequence according to which eluent is added to successive series of said first containers while evaporation of eluate in successive series of said second containers is carried out and while spotting of successive chromatographic plates is going forward.

2. In a method as recited in claim 1 and wherein said first series of containers respectively contain portions of the urine samples to which eluent is simultaneously added.

3. In a method as recited in claim 1 and wherein said first series of containers contain adsorbing agents, the urine samples being poured through said first series of containers, and including the step of collecting the urine which pours through the series of containers and then disposing of the collected urine.

4. In a method as recited in claim 1 and wherein the eluates in the second series of containers are simultaneously evaporated therefrom to leave said residues therein, and distilling the solvent from the evaporated vapors for collecting the solvent for further use.

5. In a method as recited in claim 1 and wherein said second series of containers are washed and dried and then reused after portions of said solvent with the residue dissolved therein are removed from said second series of containers.

6. In a method as recited in claim 1 and wherein a series of capillary tubes are simultaneously dipped into said second series of containers after the additional solvent has been added thereto for removing a small portion of the solvent and the residues dissolved therein from said second series of containers.

7. In a method as recited in claim 6 and wherein said capillary tubes are placed in contact with the chromatographic plate for spotting the latter after the capillary tubes have been dipped into and removed from the solvent in the second series of containers.

8. In a method as recited in claim 7 and wherein the series of capillary tubes which simultaneously withdraw part of the solvent from the series of second containers are simultaneously discarded after spotting the chromatographic plate and are then simultaneously replaced with a further series of capillary tubes.

9. In a method as recited in claim 7 and wherein said capillary tubes are washed and dried after spotting the chromatographic plate so that said capillary tubes are in a condition to be used again.

10. In a method as recited in claim 1 and wherein the spots on each chromatographic plate are compared with the results of other tests on the same samples as those used for the spots for confirming the results shown by the spots.

11. The method of claim 10 and wherein the confirmation of the spots is carried out by a colorimetric device which has a readout for the drug for which the tests are made so that comparison can be made for confirmation of the spots on the chromatographic plate.

12. In a method as recited in claim 1 and wherein said mediums in said series of first containers are parts of the urine samples themselves, the step of shaking said series of first containers after eluent has been added to the mediums therein and prior to transfer of the eluate from said series of first containers to said series of second containers.

13. In an apparatus for testing urine samples to determine the presence of a drug such as narcotic analgesics, amphetamines, and addictive sedatives, first conveyer means for successively conveying rows of first containers to an eluting station, means at said eluting station for simultaneously adding eluent to the first containers of each row when each row is located at said eluting station, each of said first containers including means for pouring eluate downwardly therefrom, second conveyer means situated in part beneath said first conveyer means for conveying rows of second containers successively to a receiving station where the second containers of each row at said receiving station are simultaneously situated beneath each row of first containers to simultaneously receive eluate poured from each row of first containers, said second conveyer means then conveying the rows of second containers successively to an evaporating station and then successively to a solvent station and a removing station, evaporating means at said evaporating station for evaporating solvent from each row of second containers which is conveyed to said evaporating station by said second conveyer means, means at said solvent station for adding solvent to the second containers of each row of second containers conveyed to said solvent station by said second conveyer means, removing means located at said removing station for removing from the second containers of each row of second containers which arrives at said removing station a portion of the solvent in each row of second containers, transfer means operatively connected with said removing means for transferring the latter from said removing station to a spotting station, third conveyer means for conveying chromatographic plates successively to said spotting station, spotting means at said spotting station cooperating with said removing means for actuating the latter to provide on each chromatographic plate conveyed to said spotting station by said third conveyer means a series of spots from said removing means, collecting means situated adjacent said third conveyer means for collecting the chromatographic plates with the spots thereon, and control means operatively connected with all of said conveyer means, as well as with said means at said eluting and solvent stations and with said removing and spotting means for actuating all of the latter means in timed relation so that they all operate in a sequence which will provide spots on successive chromatographic plates while the several conveyer means operate simultaneously.

14. The combination of claim 13 and wherein each of said first containers carries a valve means for discharging eluate from each of said first containers, said valve-actuating means located in the path of movement of said rows of first containers when they are aligned by said first conveyer means with said second containers at said receiving station for actuating said valves to discharge eluate from each row of first containers to a row of second containers aligned therewith.

15. The combination of claim 13 and wherein said evaporating means at said evaporating station is located on one side of said second conveyer means, and washing means located on the opposite side of said second conveyer means for washing said rows of second containers after said removing means has removed from said second containers solvent with the residues dissolved therein.

16. The combination of claim 13 and wherein said removing means includes rows of capillary tubes and a plurality of carrier means carrying said rows of capillary tubes, and actuating means actuating said plurality of carrier means for first dipping the tubes carried thereby into a row of second containers at said removing station and for then placing said tubes in contact with a chromatographic plate at said spotting station.

17. The combination of claim 16 and wherein a discarding means coacts with said carrier means for discarding capillary tubes therefrom after said carrier means are successively displaced beyond said spotting station and supply means for supplying new capillary tubes to each carrier means after capillary tubes have been discarded therefrom.

18. The combination of claim 16 and wherein a washing means coacts with said capillary tubes for washing the latter subsequent to said spotting station and prior to the time when said tubes reach said removing station.

19. The combination of claim 13 and wherein a magazine means is located adjacent said third conveyer means for containing a supply of chromatographic plates, said conveyer means coacting with said magazine means for successively removing chromatographic plates therefrom, and collecting means located adjacent said third conveyer means for collecting chromatographic plates therefrom after said plates have been spotted at said spotting station.

References Cited

UNITED STATES PATENTS

| | | | |
|---|---|---|---|
| 3,481,709 | 12/1969 | Slone | 23—259 X |
| 3,752,651 | 8/1973 | Bush | 23—259 X |
| 3,758,275 | 9/1973 | Quame | 23—259 |

OTHER REFERENCES

Davidson et al., "Clinical Diagnosis By Laboratory Methods," 14th ed. Saunders Co., 1969, pp. 62–64.

R. E. SERWIN, Primary Examiner

U.S. Cl. X.R.

23—253 R, 259